United States Patent
Kvamme et al.

(10) Patent No.: US 9,288,184 B1
(45) Date of Patent: Mar. 15, 2016

(54) DISTRIBUTED CUSTOMER DATA MANAGEMENT NETWORK HANDLING PERSONALLY IDENTIFIABLE INFORMATION

(71) Applicant: Wizards of the Coast LLC, Renton, WA (US)

(72) Inventors: Paul M Kvamme, Renton, WA (US); Simon Blackwell, Bainbridge Island, WA (US); Arron Goolsbey, Maple Valley, WA (US); Nicholas Mitchell, Seattle, WA (US)

(73) Assignee: Wizards of the Coast LLC, Renton, WA (US)

( * ) Notice: Subject to any disclaimer, the term of this patent is extended or adjusted under 35 U.S.C. 154(b) by 19 days.

(21) Appl. No.: 14/274,069

(22) Filed: May 9, 2014

Related U.S. Application Data

(60) Provisional application No. 61/824,327, filed on May 16, 2013.

(51) Int. Cl.
*H04L 29/06* (2006.01)

(52) U.S. Cl.
CPC .................................. *H04L 63/0227* (2013.01)

(58) Field of Classification Search
CPC ..... G06F 21/60; G06F 21/602; G06F 21/604; G06F 21/606; G06F 21/62; G06F 2221/2111; G06F 21/6245; G06F 21/6254; G06F 19/322; G06Q 50/26; G06Q 50/265; H04L 63/0227
See application file for complete search history.

(56) References Cited

U.S. PATENT DOCUMENTS

| | | | |
|---|---|---|---|
| 6,697,824 B1 | 2/2004 | Bowman-Amuah | |
| 7,069,427 B2 | 6/2006 | Adler et al. | |
| 7,533,113 B1 | 5/2009 | Haddad | |
| 7,603,317 B2 | 10/2009 | Adler et al. | |
| 7,962,962 B2 | 6/2011 | Adler et al. | |
| 8,185,931 B1 | 5/2012 | Reeves | |
| 8,239,960 B2 | 8/2012 | Frattura et al. | |
| 2001/0054155 A1* | 12/2001 | Hagan et al. | 713/193 |
| 2002/0099824 A1* | 7/2002 | Bender et al. | 709/225 |

(Continued)

FOREIGN PATENT DOCUMENTS

KR     20120028507 A     3/2012

OTHER PUBLICATIONS

Ten Steps to Develop a Multilayered Privacy Notice, The Center for Information Policy Leadership (2007).

(Continued)

*Primary Examiner* — Darren B Schwartz
(74) *Attorney, Agent, or Firm* — Perry Hoffman

(57) ABSTRACT

Systems and methods are provided for handling Personally Identifiable Information (PII) in a globally compliant manner, across and within governmental or defined synthetic jurisdictions without violating the privacy laws or rules of the involved jurisdictions. Disclosed systems for distributing PII include a regional server in a first jurisdiction with a first set of jurisdictional rules, a central computer and a recipient computer. The recipient computer is located in a second jurisdiction and inputs data conforming to a second set of jurisdictional rules. The central computer communicates with both the regional server and the recipient computer. The central computer masks data coming from the first jurisdiction and from the second jurisdiction so that the data complies with the rules of the destination jurisdiction.

20 Claims, 18 Drawing Sheets

(56) References Cited

U.S. PATENT DOCUMENTS

| | | | |
|---|---|---|---|
| 2003/0009523 A1* | 1/2003 | Lindskog et al. | 709/205 |
| 2005/0236474 A1* | 10/2005 | Onuma et al. | 235/382 |
| 2007/0185737 A1 | 8/2007 | Friedlander et al. | |
| 2008/0028436 A1* | 1/2008 | Hannel et al. | 726/1 |
| 2008/0147554 A1* | 6/2008 | Stevens et al. | G06F 19/322 705/51 |
| 2008/0177647 A1 | 7/2008 | Veenstra | |
| 2009/0106823 A1* | 4/2009 | Durski | 726/4 |
| 2009/0217351 A1* | 8/2009 | Burch et al. | 726/3 |
| 2010/0042583 A1* | 2/2010 | Gervais et al. | 707/3 |
| 2010/0241844 A1* | 9/2010 | Hussain et al. | 713/150 |
| 2011/0113050 A1* | 5/2011 | Youn et al. | G06F 21/6218 707/757 |
| 2011/0137791 A1 | 6/2011 | Zabawskyj et al. | |
| 2011/0209053 A1* | 8/2011 | Stronger et al. | 715/255 |
| 2011/0264637 A1 | 10/2011 | Peled et al. | |
| 2011/0302625 A1 | 12/2011 | Kesarwani et al. | |
| 2012/0005720 A1 | 1/2012 | McGloin et al. | |
| 2012/0023131 A1 | 1/2012 | Downey et al. | |
| 2012/0047097 A1 | 2/2012 | Sengupta et al. | |
| 2012/0047552 A1 | 2/2012 | Sengupta et al. | |
| 2012/0047553 A1* | 2/2012 | Stronger et al. | 726/1 |
| 2012/0069131 A1 | 3/2012 | Abelow | |
| 2012/0159637 A1* | 6/2012 | Dove et al. | 726/26 |
| 2012/0233129 A1 | 9/2012 | Brinkmoeller et al. | |
| 2012/0259877 A1* | 10/2012 | Raghunathan et al. | 707/757 |
| 2012/0331567 A1* | 12/2012 | Shelton | 726/28 |
| 2013/0139268 A1* | 5/2013 | An et al. | G06F 21/6245 726/26 |
| 2013/0208955 A1* | 8/2013 | Zhao et al. | 382/128 |
| 2013/0219176 A1* | 8/2013 | Akella et al. | 713/165 |
| 2014/0013452 A1* | 1/2014 | Aissi et al. | 726/30 |
| 2014/0047551 A1* | 2/2014 | Nagasundaram et al. | 726/26 |
| 2014/0115710 A1* | 4/2014 | Hughes et al. | 726/26 |

OTHER PUBLICATIONS

John T. Soma, et al, Corporate Privacy Trend: The "Value" of Personally Identifiable Information ("PII") Equals the "Value" of Financial Assets, XV Rich. J.L. & Tech. 11 (2009).

The Informatica Solution for Data Privacy, Enforcing Data Security in the Era of Big Data (2012).

Emerging Trends in International Privacy Law, 15 Emory Int'l L. Rev. 87 (2001).

Accountability as a Way Forward for Privacy Protection in the Cloud, HP Laboratories (2009).

Privacy Management in Global Organisations, HP Laboratories (2012).

Privacy Management Reference Model and Methodology (PMRM) Version 1.0, Mar. 12, 2013.

Privacy Management Reference Model and Methodology (PMRM) Version 1.0, Oct. 17, 2012.

* cited by examiner

176 — Search for Customer

DCI: 1364587823666309

| | | |
|---|---|---|
| First Name: | Testuser1 | Last Name: Lastname1 |
| Middle Name: | | Suffix: |
| Address Line1: | 123 Any Street | Address2: Suite 100 |
| 178 Address Line 3: | | City: San Francisco |
| State: | California | Country: United States |
| Postal: | 89107 | Gender: Male |
| Birth Date (mm/dd/yyyy): | 03/12/1975 | Opt In: ☒ |
| Phone: | 1-415-111-1111 | Email: cdmprototype@mail.com |
| 180 PII Loc: | NAW — 182 | Region: North America West |
| 184 Nationality | USA — 186 | Language: English |

Edit, Move or Delete
— 188

190 — Log Out

FIG. 7B

204 — Approve  Testuser1 Lastname1, DCI: 1364587782366309

| Fields | Customer Old Data | Customer New Data |
|---|---|---|
| First Name | Testuser1 | Testuser1 |
| Last Name | Lastname1 | Lastname1 |
| Middle Name | | |
| Suffix | | |
| Address Line 1 | 123 Any Street | 123 Any Street |
| Address Line 2 | Suite 100 | Suite 100 |
| Address Line 3 | | |
| City | San Francisco | San Francisco |
| Date Of Birth | 03/12/1975 | 03/12/1975 |
| State | California | California |
| Country | United States | United States |
| Postal Code | 98107 | 98107 |
| Phone | 1-415-111-1111  — 198 | 1-415-222-2222  — 200 |
| Email | cdmprototype@mail.com | cdmprototype@mail.com |
| Gender | Male | Male |
| Optin | true | true |
| Language | English | English |
| Region | North America West | North America West |
| Unknown | false | false |
| PII Location | NAW | NAW |

196

Log Out

FIG. 7D

| 206 Changes approved | | |
|---|---|---|
| Fields | Customer Old Data | Customer New Data |
| | 13645782366309 | |
| First Name | Testuser1 | Testuser1 |
| Last Name | Lastname1 | Lastname1 |
| Middle Name | | |
| Suffix | | |
| Address Line 1 | 123 Any Street | 123 Any Street |
| Address Line 2 | Suite 100 | Suite 100 |
| Address Line 3 | | |
| City | San Francisco | San Francisco |
| Date Of Birth | 03/12/1975 | 03/12/1975 |
| State | California | California |
| Country | United States | United States |
| Postal Code | 98107         198 | 98107          200 |
| Phone | 1-415-111-1111 | 1-415-222-2222 |
| Email | cdmprototype@mail.com | cdmprototype@mail.com |
| Gender | Male | Male |
| Optin | true | true |
| Language | English | English |
| Region | North America West | North America West |
| Unknown | false | false |
| PII Location | NAW | NAW |

Log Out

Customer Lookup | Add | Search/Bulk Email | Configuration Option | About 208a, 208b, 208c, 208d, 208e Create New Customer Form — 210

First Name:
Middle Name:
Last Name:
Suffix:
Password: Admin — 212
Email: ****
Language: English — 214
PII Location: NAW
Region: Select Region
Gender: ○ Male ○ Female ● N/A
Nationality: Austrian
Create Address 1:
Address 2:
Address 3:
Country: Afghanistan
State: Aichi
City:
Postal:
Birth Date:
Phone:
Opt In: ○ yes ○ No Log Out Customer Lookup    Add    Search/Bulk Email    Configuration Option    About                              Log Out Editing user Testuser1 Lastname1

DCI:              [13645878236309]
First Name:       [Testuser1]              Last Name:    [Lastname1]
Middle Name:                               Suffix:
Address Line1:    [123 Any Street]         Address2:
Address Line 3:                            City:         [San Francisco]
State:            [California ▾]           Country:      [United States ▾]
Postal:           [98107]                  Gender:       ● Male  ○ Female  ○ N/A
Birth Date:       [03/12/1975]             Opt In:       [☑]
Phone:            [1-415-222-2222]         Email:        [cdmprototype@mail.com]
PII Loc:          [North American West ▾]  Region:       [North America West ▾]
Nationality:      [USA ▾]                  Language:     [English ▾]
                  216⎯[Submit Changes]     [Delete Customer]⎯220    [Cancel]

Move Customer - Testuser1 Lastname1   (13645878236309)
                                                          218
Current PII Location:    [NAW ▾]
New PII Location:    222⎯[NAW ▾]   [Move Customer]⎯224

Figure 7H:
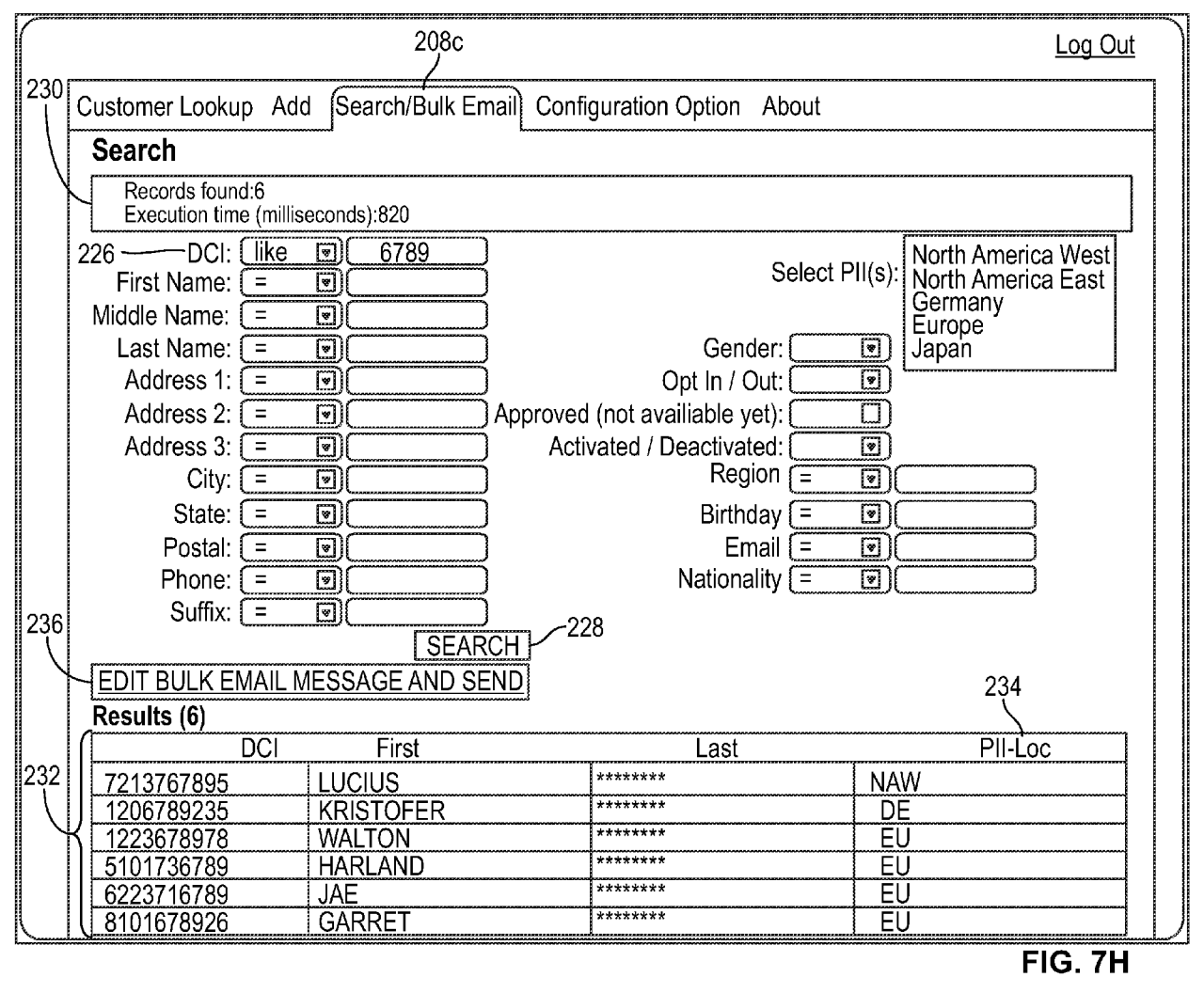

| | Customer Lookup | Add | Search/Bulk Email | Configuration Option | About | Log Out |

Search

Records found: 6
Execution time (milliseconds): 820

| | | |
|---|---|---|
| 226 — DCI: | like ▾ | 6789 |
| First Name: | = ▾ | |
| Middle Name: | = ▾ | |
| Last Name: | = ▾ | |
| Address 1: | = ▾ | |
| Address 2: | = ▾ | |
| Address 3: | = ▾ | |
| City: | = ▾ | |
| State: | = ▾ | |
| Postal: | = ▾ | |
| Phone: | = ▾ | |
| Suffix: | = ▾ | |

Select PII(s):
North America West
North America East
Germany
Europe
Japan

Gender: ▾
Opt In / Out: ▾
Approved (not available yet): ☐
Activated / Deactivated: ▾
Region: = ▾
Birthday: = ▾
Email: = ▾
Nationality: = ▾

SEARCH — 228

EDIT BULK EMAIL MESSAGE AND SEND

Results (6)

| DCI | First | Last | PII-Loc |
|---|---|---|---|
| 7213767895 | LUCIUS | ******** | NAW |
| 1206789235 | KRISTOFER | ******** | DE |
| 1223678978 | WALTON | ******** | EU |
| 5101736789 | HARLAND | ******** | EU |
| 6223716789 | JAE | ******** | EU |
| 8101678926 | GARRET | ******** | EU |

| Customer Lookup | Add Search/Bulk Email Configuration Option About |

Search for Customer

DCI: [1364587823663909] [SEARCH] [APPROVE CUSTOMER]—238
DCI: 1364587823663909

| | | | |
|---|---|---|---|
| First Name: | Testuser1 | Last Name: | Lastname1 |
| Middle Name: | | Suffix: | |
| Address Line1: | 123 Any Street | Address_2: | Suite 100 |
| Address Line 3: | | City: | San Francisco |
| State: | California | Country: | United States |
| Postal: | 98107 | Gender: | Male |
| Birth Date(MM/DD/YYYY): | 03/12/1975 | | |
| Phone: | 1-415-222-2222 | Email: | cdmprototype@mail.com |
| PII Loc: | NAW | Region: | North America West |
| Nationality: | USA | Language: | English |

Edit, Move or Delete

Log Out

FIG. 7I

+You Search Images Maps Play Video News Mail Drive Calender More ▾

COMPOSE

Inbox (6)
Starred
Important
Sent Mail
Drafts
More ▾

Search people...

More ▾                                                                                           1-7 of 7   < >   ✦ ▾

☐ ☆ ◇ notifier    Pro Tour Returns to Revnica - Player info - [ghane.garret@somedomain.com]                1:19 pm
☐ ☆ ◇ notifier    Pro Tour Returns to Revnica - Player info - [beutnagle.jae@somedomain.com]               1:19 pm
☐ ☆ ◇ notifier    Pro Tour Returns to Revnica - Player info - [cathers.harland@somedomain.com]             1:19 pm
☐ ☆ ◇ notifier    Pro Tour Returns to Revnica - Player info - [hinokawa.walton@somedomain.com]             1:19 pm
☐ ☆ ◇ notifier    Pro Tour Returns to Revnica - Player info - [hockley.kristofer@somedomain.com]           1:19 pm
☐ ☆ ◇ notifier    Pro Tour Returns to Revnica - Player info - [lusty.lucius@somedomain.com]                1:19 pm
☐ ☆ ◉ notifier (2)   Approve: Update - Approve: Update changes DCI 136458792366309 Fields Prior   1:19 pm

— 240
— 242

0% full
Using 0 GB of your 10.1 GB

Terms & Privacy                    Last account activity: 3 days ago
                                                                Details

FIG. 7J

DISTRIBUTED CUSTOMER DATA MANAGEMENT NETWORK HANDLING PERSONALLY IDENTIFIABLE INFORMATION

CROSS-REFERENCE TO RELATED APPLICATION

This application claims priority pursuant to 35 U.S.C. 119 (e) to U.S. Provisional Application No. 61/824,327 filed on Sep. 16, 2013.

FIELD OF THE INVENTION

This invention relates to systems and methods for handling Personally Identifiable Information (PII), and, more particularly, to systems and methods for handling PII in a globally compliant manner, across and within governmental or defined synthetic jurisdictions, without violating the privacy laws or rules of the involved jurisdictions.

BACKGROUND OF THE INVENTION

During the last two decades, an explosion of global, interactive, online computing, including, but not limited to, e-commerce, entertainment and research, has greatly increased the communications between and among people and computer systems in almost all parts of the world. With this advent, there has also been an explosion of people and computer systems disclosing, receiving and managing Personally Identifiable Information (PII). Moreover, with the growth and expansion of cloud computing, PII stored away from one's personal computer has become a norm. This growth of the use of PII has caused great concern among both the private sector and government alike. For example, the Ponemon Institute conducts independent research on privacy, data protection and information security policy with the goal to enable organizations in both the private and public sectors to have a clearer understanding of the trends in practices, perceptions and potential threats that will affect the collection, management and safeguarding of personal and confidential information about individuals and organizations.

In response to the dangers involved with people and computer systems disclosing, receiving and managing PII, governmental jurisdictions, including countries and states, have created privacy laws to protect individuals within their jurisdictions. For example, in the United States, the following federal laws have been created to protect PII (certain laws are identified by acronym):

COPPA—protects PII for children online.
TCPA and TSR—protect PII used in telemarketing.
CAN SPAM—protects PII used in email marketing.
Gramm-Leach-Bliley Act—protects PII used with financial transactions.
PCI—protects PII used in payment card transactions.
FCRA—protects PII used in credit checks and credit reports.
Patriot Act—allows the federal government to access PII to obstruct terrorism.
HIPAA—protects PII used in healthcare.
Cable Act—protects PII regarding a person's viewing habits.
Privacy Act—protects one from the government's use of PII.
VRPA—protects PII regarding a person's video rental habits.
DPPA—protects PII regarding a person's driving records.

Various states in the United States have created the following laws to protect PII:

Many states have unfair and deceptive trade practices laws known as "Baby FTC Acts" that provide similar protection to the acts created by the FTC.
Notice of security breach acts require an entity to notify consumers when their PII has been or may have been breached.
General data security/data destruction acts protect accidental or illegal use of PII.
Many state laws protect PII used in telemarketing.
Many state laws protect PII relating to employment and employees.
The California Online Privacy Protection Act prevents operators of commercial websites and online services from mishandling PII
The California "Shine the Light" Act limits how PII may be used for marketing, or "list brokerage".
Many state laws protect the use of social security numbers.
Many state laws protect PII used in pharmaceutical drug transactions.
Many state laws protect PII used in financial transactions.
Many state laws protect PII by limiting the use of spyware.

In the European Union (EU), there is no single law protecting PII. However, generally, EU laws apply to all forms of data processing, including storing data. Databases must typically be registered with national data protection authorities in various countries. EU Model Clauses have been developed to restrict the use and the geographic location of data and are required for non-EU hosting. Individuals have the right to access and correct their personal data. Handlers of data have certain technical requirements to fulfill security obligations, and sensitive data, such as PII, is subject to additional restrictions.

While many other countries have similar protections to those provided in the United States and in Europe, many countries or other jurisdictions have privacy rules under consideration and not yet implemented or none at all.

Certain inventions have attempted to handle the management of PII. For example, U.S. Pat. No. 7,069,427 to Adler, et al. for "Using a Rules Model to Improve the Handling of Personally Identifiable Information" issued Jun. 27, 2006 relates to a system and method for handling personally identifiable information using a rules model. This patent involves defining a limited number of privacy-related actions regarding personally identifiable information, constructing a rule for each circumstance in which one of said privacy-related actions may be taken or must be taken, allowing for the input of dynamic contextual information to precisely specify the condition for evaluation of a rule, creating a programming object containing at least one of said rules, associating the programming object with personally identifiable information, processing a request, and providing an output. This invention specifies additional actions that must be taken, such as 1) authorizing a privacy-related action; 2) authorizing a privacy-related action plus specifying more tasks; or 3) denying a request but also suggesting what must be done to have said request approved. The concept of an empty form for gathering data under a specified policy, and a filled form for representing the gathered data along with the policy, are used when describing data actions. The rules model is based on the following limited set of privacy-related actions: access, disclose, release, notify, utilize, update, withdraw consent, give consent, delete, anonymize, depersonalize, and repersonalize.

U.S. Pat. No. 7,533,113 to Haddad for "System and Method for Implementing Privacy Preferences and Rules within an E-Business Data Warehouse" issued May 12, 2009 relates to a computer implemented method of and apparatus for collecting and managing customer related information within an E-Business customer relationship management system. The customer relationship management system includes a database in which customer-related information, as well as privacy policy and privacy consent information governing the collection and use of customer related information, is stored and organized. The database includes tables containing privacy consent default values for customers of the E-Business retailer and high-level privacy consent values selected by the customers, specific privacy consent values selected by the customers for a plurality of privacy categories defined by the Platform for Privacy Preference (P3P), and privacy consent values selected by the customers for different customer addresses. In the situation where customers or potential customers include minor children, the database includes a database table containing parental privacy consent values for said children under thirteen years of age. The design supports four levels of privacy granularity, which can be used independently or in a complimentary fashion.

U.S. Pat. No. 7,603,317 to Adler, et al. for "Using a Privacy Agreement Framework to Improve Handling of Personally Identifiable Information" issued Jan. 16, 2003 relates to identifying the parties involved in a process of handling personally identifiable information, identifying the data involved in said process, classifying the data, expressing each relationship between each pair of said parties in terms of a privacy agreement, and representing the parties, data, and privacy agreements graphically in one or more privacy agreement relationship diagrams. Privacy agreements are based on a limited set of privacy-related actions: access, disclose, release, notify, utilize, update, withdrawConsent, giveConsent, delete, anonymize, depersonalize, and repersonalize.

U.S. Pat. No. 7,962,962 to Adler, et al. for "Using an Object Model to Improve Handling of Personally Identifiable Information" issued Jun. 14, 2011 relates to methods and systems for handling PII by "(1) providing in a computer a first set of object classes representing active entities in an information-handling process, wherein a limited number of privacy-related actions represent operations performed on data; (2) providing in the computer a second set of object classes representing data and rules in the information-handling process, wherein at least one object class has rules associated with data; and (3) handling transactions involving personally identifiable information, using the computer and object classes."

Although handling PII between parties and systems has been addressed in the prior art, the prior art has not addressed handling PII in a globally compliant manner across and within governmental or defined synthetic jurisdictions without violating the privacy laws or rules of the involved jurisdictions. Accordingly, it would be desirable to create systems and methods to protect individuals by having information personally protected and subject to the rules of their own jurisdiction and by having that same protected information properly disseminated in jurisdictions with less stringent, more stringent or different privacy rules.

SUMMARY OF THE INVENTION

The present inventions address the problems associated with governmental and other jurisdictions having different laws and limits for what Personally Identifiable Information may be disclosed and transferred between jurisdictions. The approach is to distribute PII globally into the jurisdictions in which the data subjects reside and/or fragment the data such that it is no longer PII and reassemble it in the local jurisdiction. The approach also includes establishing regionally compliant tools for accepting terms, soliciting engagement and managing the data.

Described embodiments define a system for distributing personally identifiable information having a regional server, a central computer and a recipient computer. The regional server is located in a first jurisdiction and has a first set of jurisdictional rules that define personally identifiable information for the first jurisdiction. A first computer application in the regional server inputs data, applies the first set of jurisdictional rules to the data and outputs a first data set that is personally identifiable information and a second data set that is not personally identifiable information. The regional server has two data repositories, a first data repository in communication with the first computer application that stores data that have been input but that have not had the first set of jurisdictional rules applied and a second data repository in communication with the first computer application that stores the first data set. The regional server further has a first set of masking rules for masking the first data set and a second computer application in communication with the first computer application that interprets and applies the first set of masking rules to obfuscate the first data set.

The recipient computer is located in a second jurisdiction and inputs data conforming to a second set of jurisdictional rules that define personally identifiable information for the second jurisdiction. The recipient computer communicates with the regional server through the central computer.

The central computer communicates with both the regional server and the recipient computer. The central computer uses a rules interpreter that inputs the first data set, that applies the second set of jurisdictional rules to the first data set and that outputs a third data set of personally identifiable information conforming to the second set of jurisdictional rules. The central computer further has a second set of masking rules for masking the third data set and a third computer application in communication with the rules interpreter that applies the second set of masking rules to obfuscate the third data set. A fourth computer application in the central computer receives the first data set from the regional server and routes it to the rules interpreter and receives the third data set from the third computer application and routes the third data set to the recipient computer.

The first jurisdiction and the second jurisdiction defined above each may be a governmental jurisdiction and a synthetic jurisdiction.

In some embodiments, the regional server has a user interface in communication with the first computer application for user data input and data editing and an email facility in communication with the first computer application wherein all email communication is within a jurisdiction. Additional embodiments protect the system with a firewall in the regional server to control all incoming and outgoing data. Thus, further embodiments that have a web service engine and web application hosting in the regional server may be protected.

In further embodiments, a plurality of regional servers are used with each regional server located in one of a plurality of different jurisdiction and with each regional server in communication with the central computer and having its own set of jurisdictional rules and its own set of masking rules. A separate set of jurisdictional rules define personally identifiable information for each of the plurality of different jurisdictions, and a separate set of masking rules are used for each of the plurality of different jurisdictions.

In the described embodiments, a third-party cloud based customer relationship management software customer experience suite is located in the second jurisdiction. A fifth computer application in the central computer is in communication with the rules interpreter and the third-party cloud based customer relationship management software customer experience suite and applies the second set of masking rules to obfuscate the third data set.

The recipient computer in some embodiments includes a customer management system user interface and a set of computer applications related to the services provided to the regional server by the recipient computer. A service in the recipient computer acts as a logical abstraction point between the set of computer applications and the central computer. This service handles the communications and data management between and among the central computer, the applications and the customer management system user interface.

Described embodiments employ operational tools that use a ticket pattern to allow actions in the system including authentication, authorization, acceptance of terms and conditions, requirements and opt-in acceptance. As noted above, treatment rules are used for the treatment of personally identifiable information attribute values that control the allowable use of data and how data should be masked given the time periods during which approvals and other actions must occur. Moreover, administrative rules may be used in these embodiments for the creation, specification and management of personally identifiable information attributes and attribute values and the creation, retrieval, updating, deletion and movement of jurisdictions.

Other described embodiments define a network for managing personally identifiable information exchanged between computer systems in jurisdictions with different rules regarding handling personally identifiable information having a plurality of regional servers, a central computer and a recipient computer. The regional servers reside in a plurality of respective jurisdictions. Each regional server has a first set of jurisdictional rules that define personally identifiable information for the respective jurisdiction. Each regional server also has a first computer application that inputs data, that applies the first set of jurisdictional rules to the data and that outputs a first data set that is personally identifiable information and a second data set that is not personally identifiable information. Each regional server has two repositories, a first data repository in communication with the first computer application that stores data that have been input but that have not had the first set of jurisdictional rules applied and a second data repository in communication with the first computer application that stores the first data set. Each regional server further has a first set of masking rules for masking the first data set and a second computer application in communication with the first computer application that interprets and applies the first set of masking rules to obfuscate the first data set.

The recipient computer is located in one of the plurality of jurisdictions and inputs data conforming to the respective set of jurisdictional rules that define personally identifiable information for the respective jurisdiction. The recipient computer communicates with the plurality of regional servers through the central computer.

The central computer communicates with the plurality of regional servers and the recipient computer. The central computer uses a rules interpreter that inputs the first data set, that applies the set of jurisdictional rules for the recipient computer to the first data set and that outputs a third data set of personally identifiable information conforming to the set of jurisdictional rules for the recipient computer. The central computer further has a second set of masking rules for masking the third data set and a third computer application in communication with the rules interpreter that applies the second set of masking rules to obfuscate the third data set. A fourth computer application in the central computer receives the first data set from the regional server and routes it to the rules interpreter and receives the third data set from the third computer application and routes the third data set to the recipient computer.

Each jurisdiction defined in the network above may be a governmental jurisdiction or a synthetic jurisdiction.

In some embodiments, each regional server has a user interface in communication with the first computer application for user data input and data editing and an email facility in communication with the first computer application wherein all email communication is within a jurisdiction. Additional embodiments protect the network with a firewall in each regional server to control all incoming and outgoing data. Thus, further embodiments that have a web service engine and web application hosting in each regional server may be protected.

In the described embodiments of the network, a third-party cloud based customer relationship management software customer experience suite is located in the jurisdiction with the recipient computer. A fifth computer application in the central computer is in communication with the rules interpreter and the third-party cloud based customer relationship management software customer experience suite and applies the set of masking rules used in the jurisdiction with the recipient computer to obfuscate the third data set.

The recipient computer in some embodiments of the network includes a customer management system user interface and a set of computer applications related to the services provided to the regional server by the recipient computer. A service in the recipient computer acts as a logical abstraction point between the set of computer applications and the central computer. This service handles the communications and data management between and among the central computer, the applications and the customer management system user interface.

Certain described embodiments define a method for distributing personally identifiable information that includes providing a regional server, a central computer and a recipient computer. The method involves locating the regional server in a first jurisdiction and defining personally identifiable information for the first jurisdiction with a first set of jurisdictional rules. The method also involves executing a first computer application to input data, to apply the first set of jurisdictional rules to the data and to output a first data set that is personally identifiable information and a second data set that is not personally identifiable information. The method further requires providing a first data repository in communication with the first computer application that stores data that have been input but that have not had the first set of jurisdictional rules applied, providing a second data repository in communication with the first computer application that stores the first data set, defining a first set of masking rules for masking the first data set, and executing a second computer application in communication with the first computer application that interprets and applies the first set of masking rules to obfuscate the first data set.

The method provides that the recipient computer is located in a second jurisdiction and inputs data conforming to a second set of jurisdictional rules that define personally identifiable information for the second jurisdiction. The method includes the recipient computer communicating with the regional server through the central computer.

The method involves the central computer communicating with the regional server and the recipient computer. The method further includes the central computer executing a rules interpreter to input the first data set, to apply the second set of jurisdictional rules to the first data set and to output a third data set of personally identifiable information conforming to the second set of jurisdictional rules. Additionally, the method involves defining a second set of masking rules for masking the third data set and executing a third computer application in communication with the rules interpreter that applies the second set of masking rules to obfuscate the third data set. The described method also involves executing a fourth computer application that receives the first data set from the regional server and routes it to the rules interpreter and that receives the third data set from the third computer application and routes the third data set to the recipient computer. Other embodiments of described methods include providing a third-party cloud based customer relationship management software customer experience suite located in the jurisdiction with the recipient computer and executing a fifth computer application in the central computer in communication with the rules interpreter and the third-party cloud based customer relationship management software customer experience suite.

The various inventions provided in connection with the described embodiments address the forgoing and other deficiencies of the prior art. The features and advantages of the present inventions will be explained in or apparent from the following detailed description of the embodiments considered together with the accompanying drawings.

The embodiments may be understood with the following terms:

Adapter—The application that interprets the storage location rules, update rules and masking rules in the central location near the CRM. It accepts, processes, directs and returns data to a regional server.

CDM—Customer Data Management.

CRM—Customer Relationship Management.

Customer Support/Customer Service—The group of individuals responsible for the delivery and support of a product or service on behalf of an entity from which a PII Data Subject has procured the product or service and has expectations regarding is quality, serviceability, accuracy, etc.

Data Subject—Consumers who play analog or digital games, individuals or other entities that organize and run tournaments or events, retail locations, judges of tournaments or events, or professional players.

Distributed CDM Network (DCDMN)—The network embodiments that are referred to, including both the web services and regional data centers.

DCDMS—The overall collection of applications that constitute the Distributed Customer Data Management System (of which the DCDMN is just one component).

Distributor—The mechanism which actually routes the messages between the central system and the Local Nodes.

Legal Jurisdiction—Practical authority granted to a formally constituted legal body or to a political leader to deal with and make pronouncements on legal matters and, by implication, to administer justice within a defined area of responsibility. The term is generally used to denote the geographical area or subject matter to which such authority applies.

Local Node—A complete PII location containing a data repository, a web service engine, web application hosting and an email facility to which independent security and penetration testing is applied.

Obfuscator—The software device that interprets and applies the masking rules in a Local Node or in the central Adapter.

Person Service—The logical abstraction point between all applications and the physical persistence system.

Personally Identifiable Information (PII)—Non-transactional, non-relational attributes of Data Subjects that when taken alone or together can be used to uniquely identify the Data Subject.

PII Owner—The owner of the PII data elements.

Regional Server—A Local Node placed within a jurisdiction. It may represent data from multiple locations.

RNT—A third party cloud based CRM software customer experience suite. It may be provided by RightNow Technologies, Inc. or by some other comparable third-party technology vendors.

Rules—A list oriented set of jurisdictions, countries, PII elements, masking rules and operating parameters. Rules control masking, security, jurisdiction, routing, and PII elements, among other areas.

Synthetic Jurisdiction—Logical grouping of one or more independent Legal Jurisdictions, which may be countries, states or other legal authorities.

Ticket—A small, encrypted identification string with a limited validity period, which is issued after authentication, and carries with it tokenized authorizations.

User Interface (UI)—a user interface that supports viewing and updating customer data and information by Customer Support as noted in use case descriptions.

Treatment Rules—Rules regarding the treatment of the PII attribute values.

BRIEF DESCRIPTION OF THE DRAWINGS

The inventions will now be more particularly described by way of examples with reference to the accompanying drawings. Novel features believed characteristic of the inventions are set forth in the claims. The inventions themselves, as well as the preferred modes of use, further objectives, and advantages thereof, are best understood by reference to the following detailed description of the embodiment in conjunction with the accompanying drawings, in which:

FIG. 7B shows a sample customer data screen following an administrator's customer search.

FIG. 7D shows a sample screen used outside of email for system administrator approval of data changes.

FIG. 7E shows a sample screen showing that the system administrator has approved changes.

FIG. 7F shows a sample screen for creating a new customer account.

FIG. 7G shows a sample screen for editing customer information.

FIG. 7H shows a query used in a sample search screen for sending a bulk email to several regions.

FIG. 7I shows a sample screen used for system administrator approval of customer updates that generates an email to the customer.

FIG. 7J shows a system administrator's email inbox showing that the bulk email and the update confirmation email have been sent to customers.

DETAILED DESCRIPTION OF THE EMBODIMENTS

Figure 1:
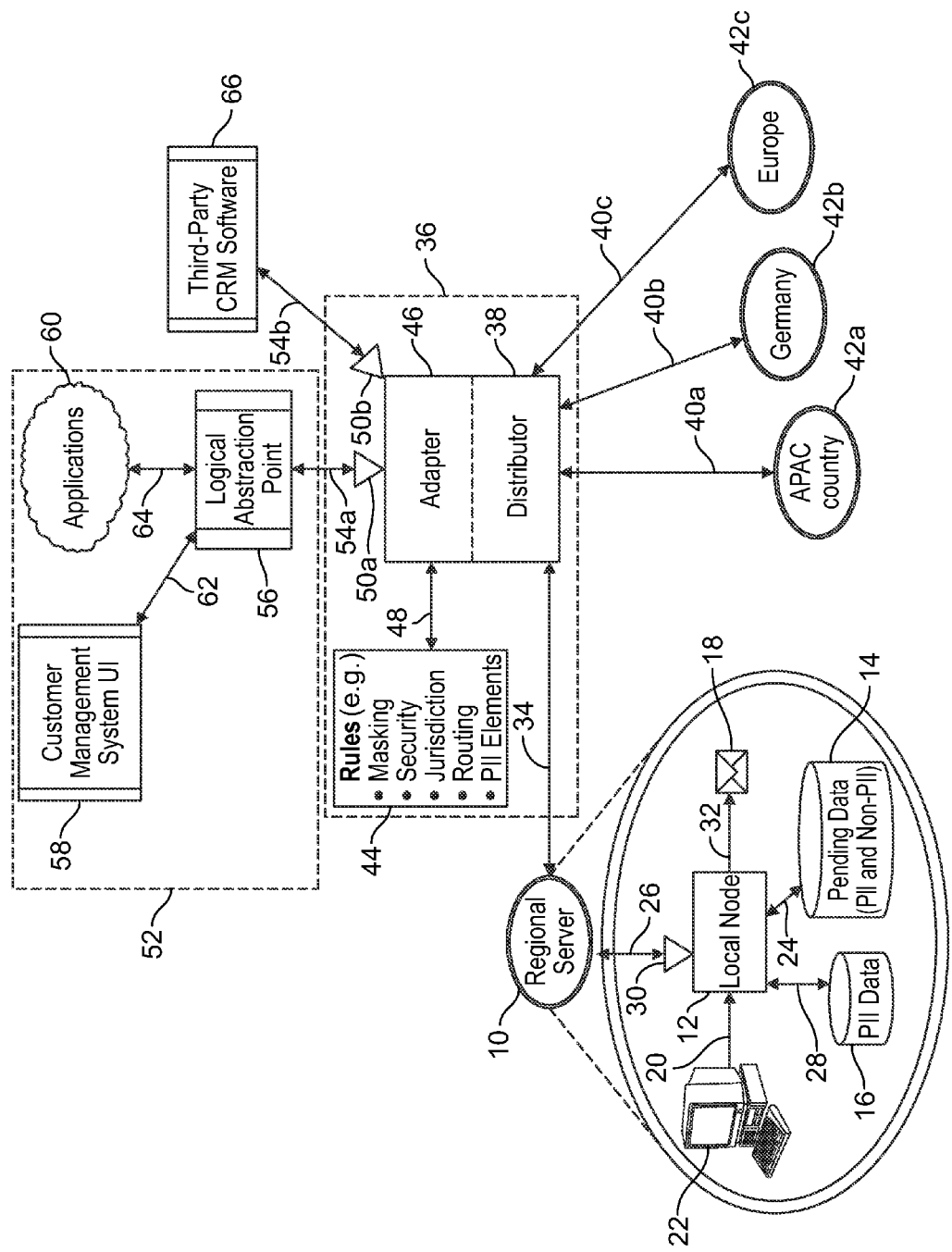
FIG. 1 shows CDM high level system architecture.

The described embodiments are systems and methods for handling Personally Identifiable Information (PII) in a globally compliant manner, across and within governmental or defined synthetic jurisdictions, without violating the privacy laws or rules of the involved jurisdictions. The object of the inventions is to operate and maintain systems that allow one to collect, to store, to manage and to use a subset of customer data, or PII, potentially comprising both sensitive and confidential information elements, in a globally compliant way.

The DCDMN is comprised of a series of regionalized services that store and manage customer data in a compliant fashion based on the applicable laws of the relevant jurisdictions. These regional services connect to applications through a digital data routing system in a manner that allows applications to display the sensitive data in a legally compliant fashion. The totality of all systems involved in the management and use of customer data is called the Customer Data Management System (CDMS).

The DCDMN is designed to support the creation, retrieval, updating, and deletion of PII of potentially millions of Data Subjects existing in over 100 countries managed by services deployed in many Synthetic Jurisdictions. These regions may or may not be geographically contiguous. They are defined based on the similarity of regulatory and risk profiles associated with the actual Legal Jurisdictions of which they are comprised. Risk profiles will be based on legal complexity, enforcement activity, and the size of the market for products.

The criteria for composing PII and how it should be treated may vary from country to country. Thus, the DCDMN is also designed to include a set of administrative tools to support the creation, specification and management of PII attributes and associated rules regarding the treatment of the PII attribute values ("Treatment Rules"). Furthermore, new Legal Jurisdictions may appear, and the regulatory or risk profile of existing Legal Jurisdictions may change; hence, the administrative tools must also support the creation, retrieval, updating, and deletion of Synthetic Jurisdictions and the functional ability to move a Legal Jurisdiction from one Synthetic Jurisdiction to another Synthetic Jurisdiction. The administrative tools must further apply new sets of rules or updates to data already existing in a jurisdiction. Finally, within the scope of the DCDMN, a set of operational tools may be used to support monitoring, optimization, and running of the services that comprise the system.

As examples, embodiments of the described inventions may use the following tools. A Secure Message Display Service may provide a messaging framework for creating a real-time, or near real-time, messaging environment that can be used within one's web experience. Applications and websites that are managed must be able to generate and deliver notifications to both individuals and groups of users through this service. For example, banking websites have a "Message Center" where a customer may be notified of an important change or an account update. The "Message Center" behaves like an email box but is contained only within the customer's web experience. Another useful tool is an Opt-In/Opt-Out Service whereby a user may opt in or out of the service by setting a single universal flag that is not considered PII.

Further tools may be used in a CDMS in conjunction with a DCDMN as follows. An Invite Utility may be used to select and invite registered consumers to participate in sanctioned play or a marketing event based on a number of PII and non-PII attribute values without exposing to the inviter the identity of the invitee(s). Attribute values may include such data as point totals, country of residence, and/or player category (e.g. Pro Player). The email system must additionally be able to support the local sending of individual emails based on actions within the local system. Another tool may include a CRM platform such as the Oracle provided SaaS tool or similar tool, which may be used for incident management and knowledge based game and sales support to consumers, retail stores and personnel supporting organized play or other activities. An Account Management Tool may include an online tool for Data Subjects to maintain their own PII. An Opt-In/Opt-Out System tool may allow a consumer to opt in or out of company related marketing. Additionally, a Message Distribution Service may include an online tool to deliver customized messages to consumers. Messages will be customized and delivered based on a number of PII and non-PII attribute values without exposing to the marketer the identity of the recipient.

For the purposes of describing the architecture, in all cases, PII is defined as non-transactional, non-relational attributes of Data Subjects that when taken alone or together can be used to uniquely identify the Data Subject. The complexities of tracking and managing transactional or relational data, such as purchase records or group memberships, across Legal Jurisdictions are not in the scope of the described embodiments. However, outside the scope of the described embodiments, users of the embodiments may normalize any transactional or relational data stores the users happen to keep such that they utilize no identifiers that can be tracked to individuals or use anonymous identifiers resolvable only by the DCDMS. Thus, if relational and transactional information is associated with a unique ID that could be permanently and completely decoupled from the PII, then the transactional information is not considered PII for the purpose of this system.

While IP addresses can be considered transactional in nature, the non-enduring connections to web service endpoints are considered short term transitory elements necessary for communication and are not utilized for identification or tracking purposes. However, they may be logged for internal, technical and fraud prevention activities.

In the described embodiments, many Data Subjects will be consumers who play analog or digital games. At times, these consumers may also be tournament organizers, store owners, judges, or professional players governed by contractual commercial relationships. Although personal information related to commercial relationships is often treated in a more relaxed manner by law, due to the large overlap in actual people with dual roles and regulations that vary by Legal Jurisdiction, management may be simplified by generally treating PII from these subjects in the same manner at a technology systems level. However, the role(s) that the individual may play are not stored within or part of the DCDMS.

In the described embodiments, PII access is restricted. With the exception of an initial data import, only the PII Owners themselves may create Data Subjects. There are four classes of individuals that must be able to retrieve data about Data Subjects: the PII Owners, Customer Support, marketing staff including organized play marketing, and regulatory compliance staff. Both Customer Support and marketing staff may be agents rather than employees, (e.g. Tournament Organizers). There are only two classes of individuals that can initiate updates to Data Subject PII, Customer Support and the PII Owners. In both cases the Data Subjects must approve the changes. There are only two classes of individuals that can initiate deletion of Data Subjects, Customer Support and the PII Owners. Confirmation is not required. Action must be taken by the PII Owner to stop the deletion after it has been initiated.

In no case can the Data Subject assign access rights to another person. The following table explains the actions that each Data Subject is allowed to take:

|  | Create Data Subject | Retrieve Data Subject | Update | Confirm Update/ Change | Delete |
|---|---|---|---|---|---|
| PII Owner (self) | X | X | X | X | X |
| Customer Support Manager |  | X | X | In rare administrative cases | X |
| Customer Support Agent |  | X | X |  |  |
| Marketing Manager |  | X |  |  |  |
| Marketing Agent |  | X |  |  |  |
| Organized Play |  | X |  |  |  |
| Independent Tournament Organizer |  | X |  |  |  |
| Compliance Staff |  | X |  |  |  |

All access will be controlled using a Ticket pattern where authentication, authorization, and ticket issuance is handled outside the system. The operational tools will provide a means to match Ticket types to allowable actions in DCDMN. Validation and use of the Ticket is within the scope for the DCDMN. The Ticket will reflect authentication, authorization, acceptance of terms and conditions, requirements and, where necessary, opt-in acceptance.

The DCDMN includes administrative tools that can create, retrieve, update, and delete Synthetic Jurisdictions, Legal Jurisdictions, PII attributes, PII usage types and PII Treatment Rules. In the regressive case, a Synthetic Jurisdictions may contain just one Legal Jurisdiction; hence, Treatment Rules are applied to Synthetic Jurisdictions, not to Legal Jurisdictions. In some cases it must be possible to copy or move items from one Synthetic Jurisdictions to a Legal Jurisdiction and apply new Treatment Rules as data enters a new jurisdiction type, (e.g., a server located in the UK for the Synthetic Jurisdiction of "Eurasia" with specific PII attributes and Treatment Rules governing all EU and Russian Data Subjects and their PII, with the exception of German Data Subjects who will be segregated, along with their PII in a server for the Legal Jurisdiction of Germany, which will have its own PII attributes and Treatment Rules). In the described embodiments, operational tools that support deploying, monitoring, stopping, and starting required services on a global level are available.

PII Treatment Rules may include such things as the allowable use of data, how data should be masked given the time periods, and during which approvals other actions must occur. The addition of PII attributes or PII Treatment Rules where PII attributes or PII Treatment Rules of a similar type already exist is dynamic and does not require recompilation or technical deployment processes.

The system is modular and service oriented. Contractual relationships are used at the system boundary to specify data, synchronicity, time, error conditions, etc. At times, proxy interfaces that will persist into the production environment are created to support isolated development and testing. All composite PII data and its structural metadata, (e.g. PII attribute names), are encrypted during storage and transit with decryption occurring on the client. Additionally, PII attribute values may be masked at the jurisdiction level prior to encryption based on PII Treatment Rules applied to jurisdictional regions and usage context. Two high level pictures of the DCDMN and the systems that interact with it are provided are shown as FIG. 1 and FIG. 2.

FIG. 1 shows CDM high level system architecture. In FIG. 1, the DCDMN and the supporting systems required for the DCDMN to operate are shown. A regional server 10, which shall be used as the reference point of a user using the described embodiments for the purpose of this description and which should not be considered limiting, acts as a local node 12 placed within a jurisdiction that may contain data from one or multiple locations. The local node 12 is a complete PII Location containing a pending data repository 14, a PII data repository 16, a web service engine, web application hosting and an email facility 18 behind a firewall that controls all incoming and outgoing data in a secured facility to which independent security and penetration testing is applied. The local node 12 runs a computer application that takes user input data 20 from a user's electronic device 22. The user input data 20 may comprise PII and non-PII data, so, upon input, the user input data 20 will be transferred as unprocessed data 24 to the pending data repository 14.

In FIG. 1, the user's electronic device 22 is shown within the regional server 10, indicating that the user's electronic device 22 may belong to a system administrator, although user input 20 may be taken from a device within the jurisdiction that communicates with the regional server 10. The local node 12 may also receive outside data 26, which is data from outside the jurisdiction that may contain non-PII data as well as encrypted and/or masked PII data. The computer application in the local node 12 receives unprocessed data 24 from the pending data repository 14, processes the data to extract PII, and sends the processed data 28 to the PII data repository 16, where it is stored within the user's jurisdiction. When the computer application processes data, the application applies the first set of jurisdictional rules to the data and outputs a first data set that is personally identifiable information and a second data set that is not personally identifiable information.

Another computer application acts as an obfuscator 30 that interprets and applies the masking rules of the local node 12 to PII data leaving the jurisdiction as outside data 26. The data leaving the jurisdiction as outside data 26 may further be encrypted before it leaves the jurisdiction. Email data 32 going to the email facility 18 is sent from within the user's region (jurisdiction). In the described embodiment, all email communication is within a jurisdiction, which is transparent to the user and avoids legal privacy issues.

Data leaving the regional server 34 includes PII data that has been masked, and possibly encrypted, and unmasked, and possibly encrypted, non-PII data and is output to a central computer 36. The data leaving the regional server 34 is output onto a bidirectional data line and input to the central computer 36, where it is routed with a distributor 38, which is a mechanism that actually routes the messages between the central computer 36 and a local node 12. FIG. 1 shows that, while a regional server 10 may be within a jurisdiction, such as Eastern North America for example, other outside bidirectional data lines 40a-c may be used to communicate with other outside regional servers 42a-c. In FIG. 1, outside bidirectional data line 40a allows the regional server 10 to communicate with an outside regional server 42a in a jurisdiction that covers Asia and the South Pacific. Similarly, outside bidirectional data line 40b allows the regional server 10 to communicate with an outside regional server 42b in a jurisdiction that covers Germany, and outside bidirectional data line 40c allows the regional server 10 to communicate with an outside regional server 42c in a jurisdiction that covers the remainder of Europe.

The central computer 36 also includes rules 44, which are a list oriented set of jurisdictions, countries, PII elements, masking rules and operating parameters, and may include other rules used to operate the system. Rules control masking, security, jurisdiction, routing, and PII elements, among other areas. The central computer 36 further has an application called an adapter 46 that interprets the rules 44, which also include the storage location rules, update rules and masking rules, using a bidirectional data line 48 between the adapter 46 and the rules 44. The adapter 46 accepts, processes, directs and returns data to the regional server 10 or to the outside regional servers 42a-c through the distributor 38.

While FIG. 1 shows that the obfuscator 30 is used to mask PII data transferred between the regional server 10 and the central computer 36 via the bidirectional data line 34, and, likewise, the outside regional servers 42a-c use obfuscators to mask data transferred between the outside regional servers 42a-c and the central computer 36 via the outside bidirectional data lines 40a-c, the central computer 36 uses obfuscator 50a to mask data output to and input from a recipient computer 52 that does not provide the PII data masking capabilities that the regional server 10 and the outside regional servers 42a-c have. In the described embodiment, the recipient computer 52 is in a jurisdiction other that the jurisdiction that holds the regional server 10. The recipient computer 52 inputs data from the obfuscator 50a over a recipient computer bidirectional data line 54a after the obfuscator 50a masks the PII data from a server outside the jurisdiction where the recipient computer 52 resides.

In embodiments described with reference to FIG. 1, users in the jurisdiction housing the regional server 10 and the outside regional servers 42a-c may be game players and the recipient computer 52 may belong to a company managing game play, tournaments, customer PII data, etc. In these embodiments, the recipient computer 52 has a logical abstraction point 56 between all applications and the physical persistence system that receives masked data from the recipient computer bidirectional data line 54a after it has been masked by the obfuscator 50a using the masking rules 44 that apply to the jurisdiction where the company managing the game play resides. The logical abstraction point 56 manages the flow of data between the obfuscator 50a and the customer management system user interface 58 and any applications 60 that the gaming and customer management supplied by the company may use. The customer management system user interface 58 is the system administrator's internal customer management system user interface. The customer management system user interface 58 is utilized for support, updating the data or revealing PII sensitive data. Communication between the logical abstraction point 56 and the customer management system user interface 58 occurs over bidirectional data line 62, and communication between the logical abstraction point 56 and the applications 60 occurs over bidirectional data line 64.

The described embodiments may use third-party CRM software 66 as a customer experience suite. CRM software such as that created by RightNow Technologies, Inc., now part of Oracle™ may be used, although other CRM software may be used. Note that the data moving between the adapter 46 and the third-party CRM software 66 is masked by the obfuscator 50b before the data travels over bidirectional data line 54b. Thus, the third-party CRM software 66 receives only non-PII data.

Figure 2:
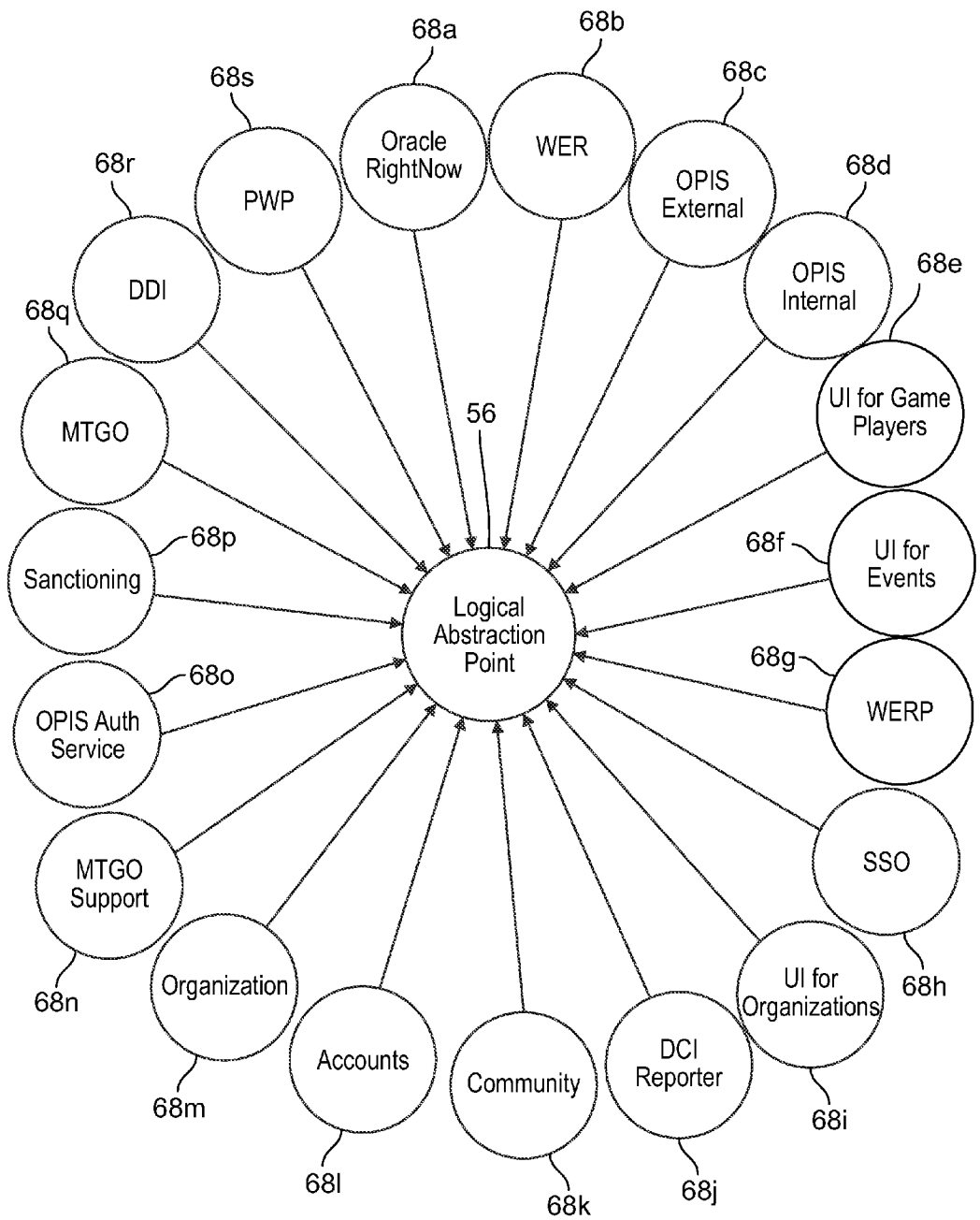
FIG. 2 shows the pervasiveness of PII.

FIG. 2 shows the pervasiveness of PII. In FIG. 2, the logical abstraction point of the DCDMN and the systems required to extract value from the DCDMN are shown for a company that may provide many products and services internationally using the Internet. In total, these systems represent the CDMS. Some components may also be part of other composite systems. Each outer circle contains an acronym or description that represents an online software systems 68a-s that requires PII. PII data is centrally utilized by many online software systems 68a-s. These online software systems 68a-s will interact with the PII repository through a web service. This ensures that all obfuscation, auditing, and authorization are applied consistently in every case that an application or system requires PII. The online software systems 68a-s shown in circles above are a company's systems and are identified here to illustrate the possibly complex nature of PII utilization within an organization.

Oracle RightNow 68a is a cloud-based customer service suite. WER 68b is Wizards Event Reporter, an event software system. OPIS External 68c is an oil price information service served from an external site. UI for Game Players 68e is a user interface for game players. UI for Events 68f is a user interface for company events. WERP 68g is a Workplace Emergency Response Planning system. SSO 68h stands for Single Sign-On and is a property of access control of multiple related, but independent software systems. With this property a user logs in once and gains access to all systems without being prompted to log in again at each of them. UI for Organizations 68i is a user interface for access to organization websites related to the company's activities. DCI Reporter 68j is an event software system that is slowly being replaced by WER 68b. Community 68k provides access to online community activities supported by the company. Accounts 68l provides access to online company accounting software. Organization 68m provides access to online company information. MTGO Support 68n provides support for Magic the Gathering Online™ from Wizards of the Coast™. OPIS Auth Service 68o is an oil price information authentication service. Sanctioning 68p provides online access to organizations that sanction online tournaments. MTGO 68q accesses Magic the Gathering Online™ from Wizards of the Coast™. DDI 68r is the Data Documentation Initiative, which is an effort to create an international standard for describing data from the social, behavioral, and economic sciences. PWP 68s provides online access to Pers' Wastaiset Produktiot, a Finnish game demo group.

For the technology stack in a described embodiment, the Microsoft™ .NET suite of development tools may be used. Other technologies, such as Java™ and the like, are also acceptable. Cloud hosting solutions such as those available from Amazon™ and Terremark™ and other similar ones are acceptable, assuming appropriate geographic distribution and security. A homogenous hosting platform is preferred, although heterogeneous is acceptable if the provider cannot support one jurisdiction with the same technology as all the other jurisdictions. From a data storage perspective, SQL object-oriented, or schema-less databases are acceptable as long as they meet the requirements for flexibility related to the obfuscation and expansion of PII attributes and PII Treatment Rules.

The described embodiments must support localization within the jurisdictions. Because the described embodiments are global, the systems must support many languages. The means by which language localization is addressed requires that a double-byte character set must be supported. All administrative user interfaces may be designed in such a way where they could subsequently be localized.

Although other configurations are available, the configurations for the described embodiments may provide rapid "push button" deployment of additional jurisdictional servers, automated migration of data to and from servers, support for automated remote deployment and upgrade facilities, load balancing, high availability options and dynamic scalability, server failover and resiliency, domain name management, and IP configuration and management.

Although other performance management designs are available, under high load or other adverse conditions, such as erratic network connectivity, the systems in the described embodiments will have the ability to gate, monitor and throttle exposed endpoints. Network latency must be minimized and maintained in the systems in the described embodiments, with less than 10 ms per net transaction expected. In the described embodiments, the systems must be resilient to intermittent Internet and connectivity issues. The core components must be highly fault tolerant and able to operate as remote nodes come and go unexpectedly. Services in the described embodiments must acquire and process data efficiently for both individual and list based requests. Ideally, single record responses would be less than 40 ms per request and list responses less than 100 ms per request, measured at the service end-point.

Although many security protocols may be used, security protocols in the described embodiments will utilize firewalling around internal components, HTTPS (SSL) traffic to and from external endpoints, certificate management, standard encrypted data transport between services and databases, alarming and alerting for breach detection (rapid fire on endpoints, etc.), encrypted databases, backups, audit logs, and domain access and publication separate from service IP end points.

In the described embodiments, data stores in all jurisdictions should contain the same data elements. If a data item is deemed to be PII in one jurisdiction, it should be assumed that it is PII in all jurisdictions. Data storage can be accomplished in either a schema or schema-less fashion. In the event that schema-based storage is selected, methods to expose the dynamic creation, deletion, etc. of new data element categories will need to be supported. In both cases, data and metadata must be encrypted when persisted. The ability to query encrypted data will be required.

Figure 3:
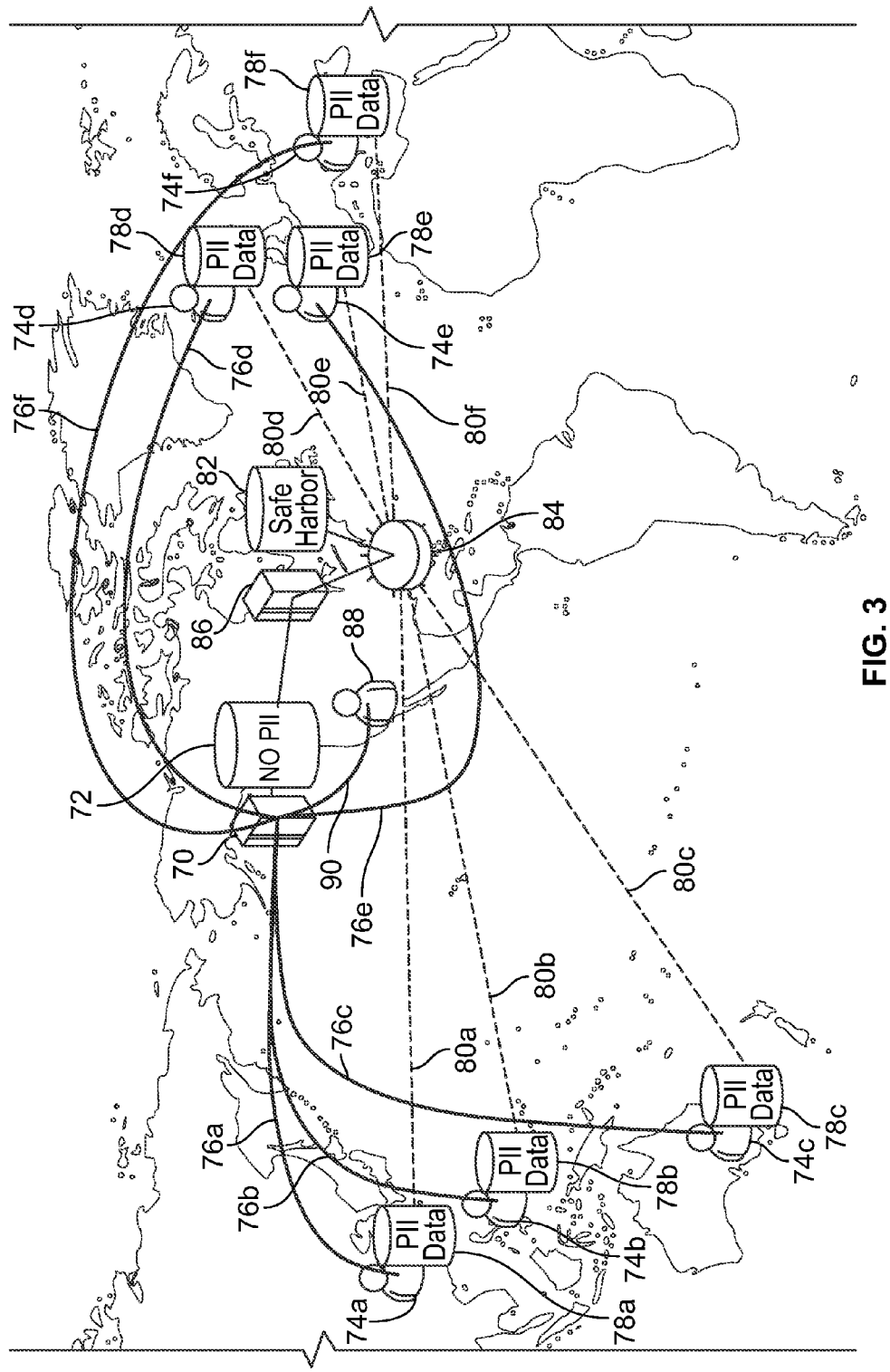
FIG. 3 shows how PII is distributed throughout the globe.

The following is a list of use cases and behaviors for the described embodiments, although this list is not a limit on the possible list cases. The list is divided into system cases and business cases. The titles of the subcategories of the system cases and the business cases and the titles of the use cases and behaviors are self explanatory:

System Cases:
  Person Service
    Get Person
    Get Person PII
    Update Person
    Force Person Confirm
    New Person
    UnKnow Person
  Person Web Page (Local Self-Service)
    Confirm Person Change
    Create Person Change
    View Person, both PII and non-PII
    New Person—Possible reuse of UI connected through Person Service
    UnKnow Person (Me)
  Timer
    Complete UnKnow
    Flush Pending Updates
  UI
    Get Person PII
    Update Person
    Unknown Person
    ForcePersonConfirm
  Oracle RightNow (ORN) Adapter
    Get Person (Pass Through)
    Update ORN Contact with Masked Person Data
  ORN Contact Screen
    Update Contact—Utilizes Person Service
    Get Person PII—May auto redirect to UI
  Person Mover (Embedded in Adapter)
    Move Person's Jurisdiction
    Confirm Move
  Person UnKnower
    UnKnowMe
    Cancel UnKnowMe
  Local Node
    Fetch Rules
    Mask Data
    Create, Read, Update and Delete (CRUD) Data Subject
    Send Email
    CreateChangeEmailAddressEvent
    CreateUnKnowPersonEvent
    Audit transaction
  Rule Changer
    Mask, Security, PII Elements, Routing, Jurisdiction
    Trigger "Fetch Rules" to local nodes
    CRUDJurisdiction
  Distributor
    Pass data to ORN
    Pass data to Person Service
    Pass rules to Local Node
    Mass Move Persons
Business Cases:
  PII Owner (via web site and email)
    Create Data Subject
    Update Data Subject
    Initiate Unknow Data Subject
    Verify Create Data Subject
    Verify Update Data Subject
    Abort Unknow Data Subject
  Customer Support (via CRM/UI)
    Initiate Update Data Subject
    Initiate Unknow Data Subject
    Override Update Data Subject (with Authorization and Reason)
    Override Unknow Data Subject (with Authorization and Reason)
    Customer Support Confirmation Override
    Read Data Subject (Obfuscated)
    Read Data Subject PII (Clear with Authorization and Reason)
  Admin (via DCDMN Admin tool)
    Create Jurisdiction
    Delete Jurisdiction
    Move Jurisdiction Configure Jurisdiction Attributes
Configure Data Attributes
　Is PII, Is not PII, Is Sensitive, Do Not Collect
Configure Masking Attributes
Backup Data
Restore Data
Manage Data Subject Record
　"Spring cleaning"
　Active/Inactive State
　Etc.
Compliance Officer (via DCDMN Admin tool)
Audit Actions of:
　Customer Support
　Administrators
　Marketing
　Organized Play
Retrieve List of Data Subjects
　Obfuscated
　Clear FIG. 3 shows how PII is distributed throughout the globe. In a described embodiment, a gaming company computer system 70, for example, may provide online gaming globally and may require handling PII for the company to operate. The company computer system 70 has access to the company database 72. The company database 72 does not contain PII. The described embodiments handle PII in a globally compliant manner, across and within governmental or defined synthetic jurisdictions, without violating the privacy laws or rules of the involved jurisdictions. Accordingly the embodiments define a system for distributing PII having a regional server in a first jurisdiction with a first set of jurisdictional rules, a central computer and a recipient computer. The recipient computer is located in a second jurisdiction and inputs data conforming to a second set of jurisdictional rules. The central computer communicates with both the regional server and the recipient computer. The central computer masks data coming from the first jurisdiction and from the second jurisdiction so that the data complies with the rules of the destination jurisdiction.

Various game players 74a-f around the world are able to communicate with the game company directly as long as no PII is sent, as shown by the non-PII data transmission 76a-f. However, if player PII data 78a-f is needed from the game players 74a-f, the player PII data 78a-f will be masked before leaving its jurisdiction. Then, player PII data transmissions 80a-f are directed through a PII location manager 84 as masked data and run through a third-party CRM software system 86, such as RNT, before reaching the gaming company computer system 70. Thus, unmasked player PII data 78a-f never leaves its jurisdiction. A Safe Harbor 82 is shown to communicate through the PII location manager 84, through the third-party CRM software system 86 and to the company database 72. The Safe Harbor 82 is a streamlined process for complying with a directives on the protection of personal data.

In FIG. 3, the administrator 88 of the gaming company computer system 70 is shown with access only to a non-PII data transmission 90. Thus, in this example, the administrator 88 does not have access to game player 74a-f PII unless it is unmasked at the administrator's location subject to jurisdictional rules.

Figure 4:
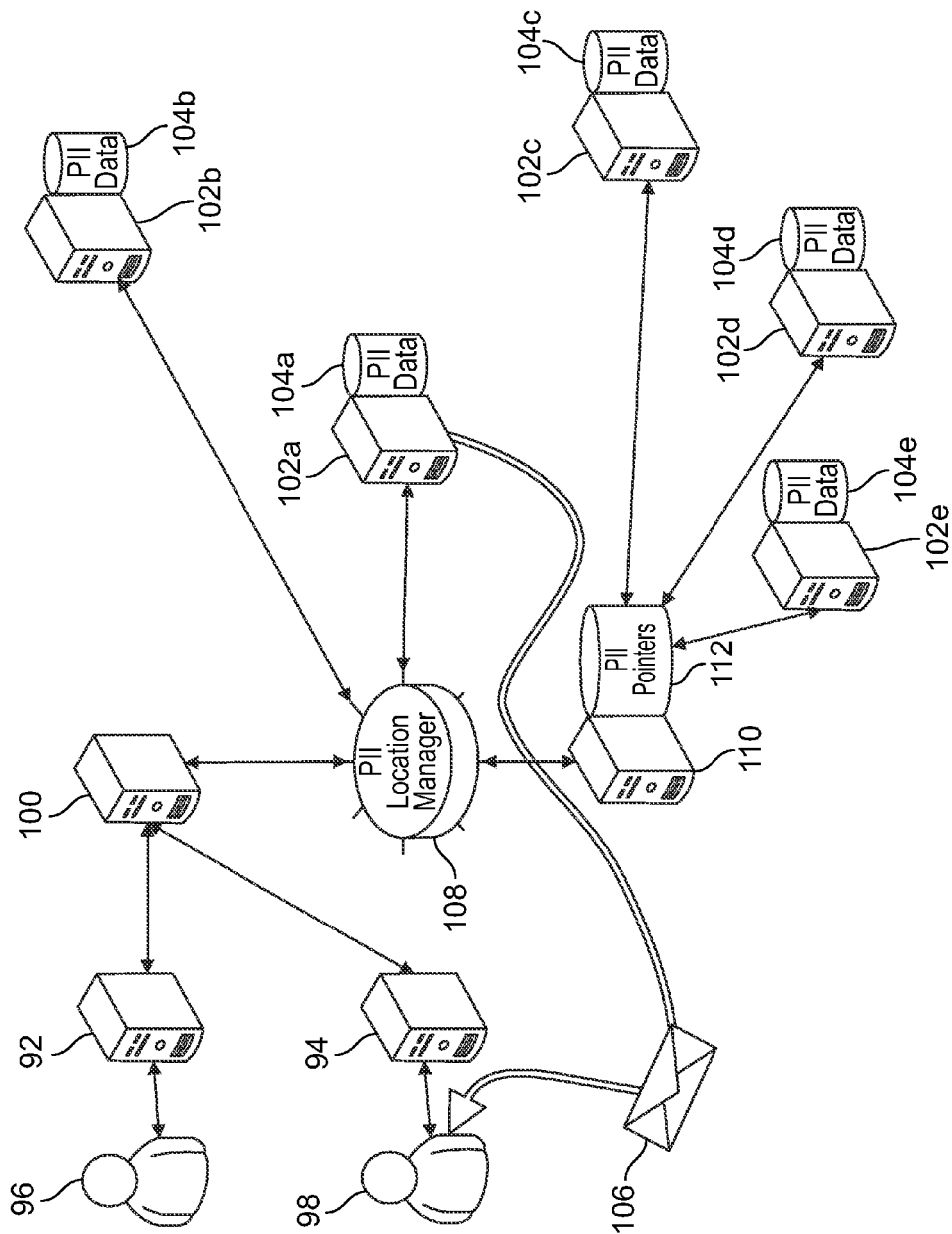
FIG. 4 shows the mechanics of distributing PII.

FIG. 4 shows the mechanics of distributing PII. In this embodiment, a gaming company computer 94 provides network access through a network access computer 94 within the USA, for example. The gaming company computer 92 and the network access computer 94 are managed by gaming support personnel 96. All communication is shown flowing through third-party CRM software system 100, such as RNT. Thus, a game player 98 accesses games supported by gaming support personnel 96 on the gaming company computer 92 through the network access computer 94 and the third-party CRM software system 100. As shown, no PII is kept on the gaming company computer 94, the network access computer 94 or the third-party CRM software system 100.

The PII data 104a-e resides in various PII data hosts 102a-e that hold the PII data 104a-e and provide proper masking. The PII data 104b may reside in a Safe Harbor data host 102b. PII data 104a may reside in a Regional Data Host 102a. There can be as many regional data host systems as necessary. Each will have its own data storage and email 106 capability. In the example shown in FIG. 4, the gaming company computer 92, the network access computer 94, the gaming support personnel 96, the game player 98, the third-party CRM software system 100, the regional data host 102a, the Safe Harbor data host 102b, the PII data 104a, the PII data 104b and email transmission 106 are located in the United States.

FIG. 4 shows how a game player 98 is notified by a confirmation email transmission 106 showing approval for any changes made to the game player's 98 PII record. Note that the email transmission 106 is sent from within the user's region (jurisdiction). In the described embodiment, all email transmission 106 communication is within a jurisdiction, which is transparent to the user and avoids legal privacy issues. Also, note that all PII data 104a-b records are stored within the user's region, which allows compliance, and all PII data 104a-b remains within the jurisdiction. Further note that all communication of PII data 104a-b is through the PII location manager 108.

Thus, far, FIG. 4 has described operation fully within one region, the United States. FIG. 4 also shows data federation technology as another possible configuration for the described embodiment where a non-USA regional distributor 110 manages and distributes PII data from several non-USA atomic data host 102c-e, each containing PII data 104c-e, respectively. The non-USA regional distributor 110 uses PII pointers 112 to direct data from the non-USA atomic data hosts 102c-e through the PII location manager 108 to the third-party CRM software system 100. Thus, it can be seen from FIG. 4 how global communication between and among players and the company may be accomplished while protecting PII.

Figure 5:
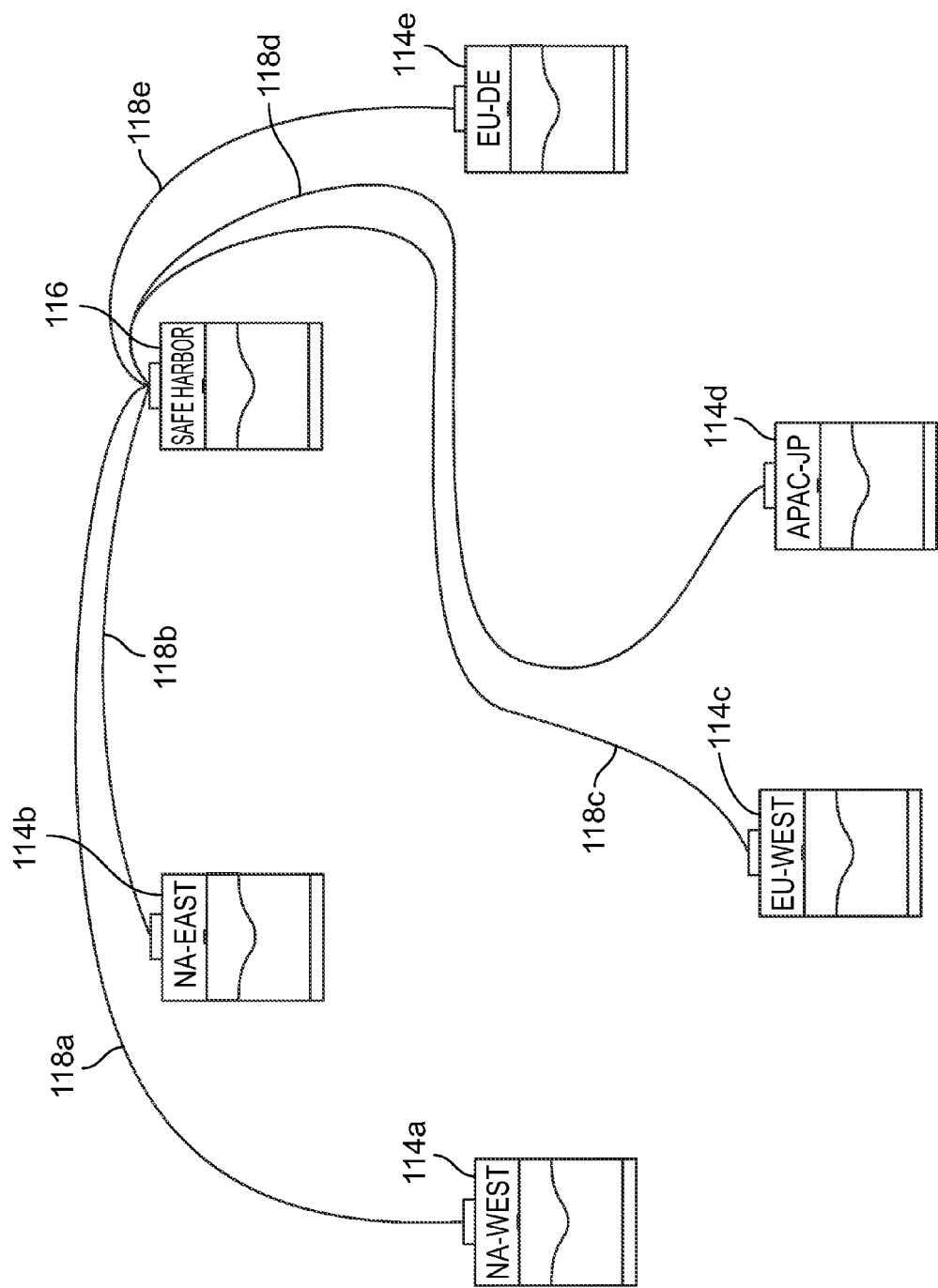
FIG. 5 shows a sample server infrastructure.

FIG. 5 shows a sample server infrastructure. This infrastructure is shown with five jurisdictional regions 114a-e with a Safe Harbor 116 framework used as both a master service for data from all regions and as a Safe Harbor data service. FIG. 5 shows a Western North American region 114a in Northern California, an Eastern North American region 114b in Miami, a Western European region 114c in Ireland, a local Japanese host 114d in Japan, and a local German host 114e in Germany. Other infrastructure configurations are possible. Because the Safe Harbor 116 is used as a master service for data from all regions, the data from the jurisdictional regions 114a-e to the Safe Harbor 116 are transferred as mixed data transmissions 118a-e.

Figure 6A:
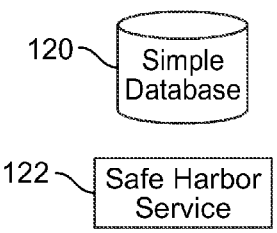
FIG. 6A shows the components of a Safe Harbor datacenter.
Figure 6B:
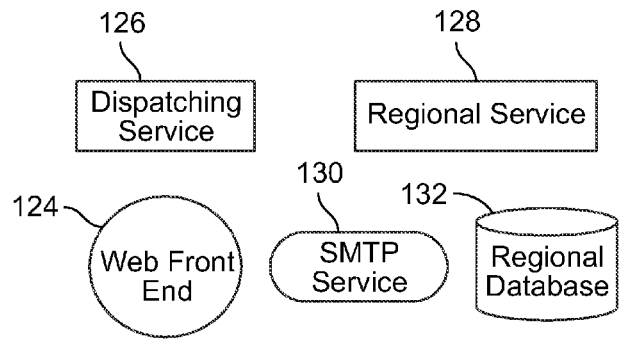
FIG. 6B shows the services at each regional datacenter.
Figure 6C:
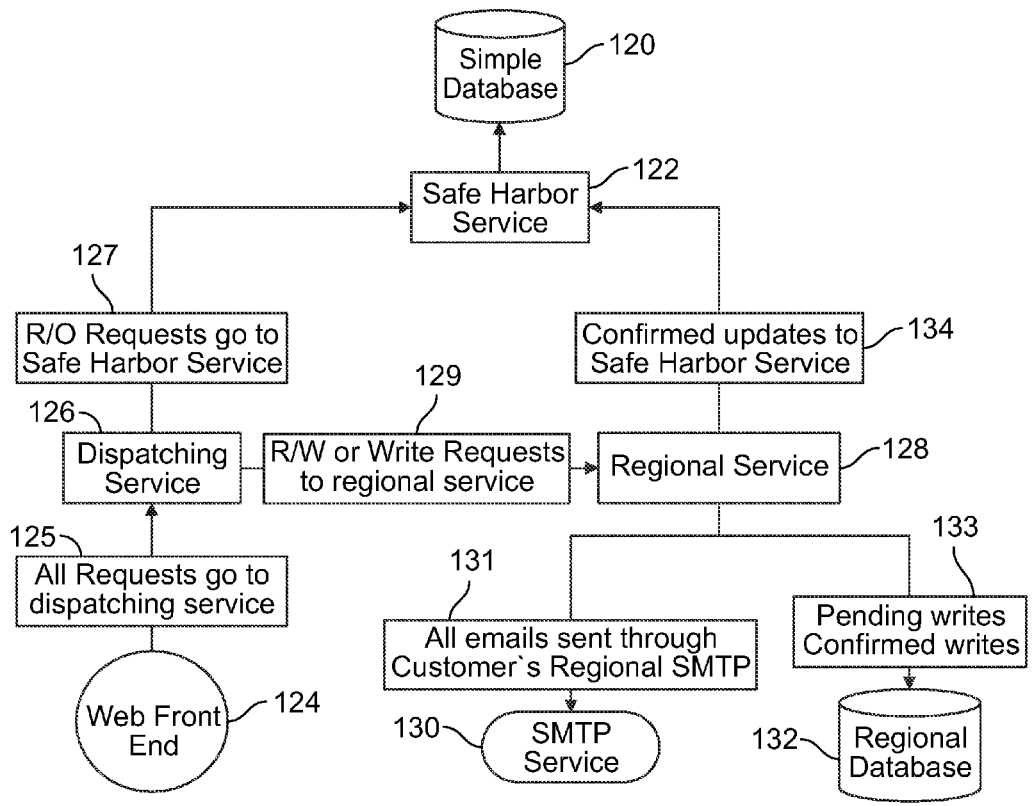
FIG. 6C shows the communication of the difference services.

FIG. 6A shows the components of a Safe Harbor datacenter. A Safe Harbor datacenter contains a simple database 120 plus a Safe Harbor framework compliant data service 122. FIG. 6B shows the services at each regional datacenter. As shown, each regional datacenter will include a web front end 124, a dispatching service 126, a regional service 128, a SMTP service 130, and a regional database 132. FIG. 6C shows the communication of the difference services. Through the web front end 124, step 125 sends all requests go to the dispatching service 126. In step 127, read-only requests go to the Safe Harbor service 122, and in step 129, read-write requests go to the regional service 128. In step 134, all confirmed updates go to the Safe Harbor service 122, and all data to the Safe Harbor service 122 are stored in the simple database 120, which is considered a Safe Harbor. In step 133, the regional service 128 sends all pending writes and all confirmed writes to a regional database 132. In step 131, the regional service 128 also sends all emails through the customer's regional SMTP service 130. Note that all emails stay within a region.

Figure 6D:
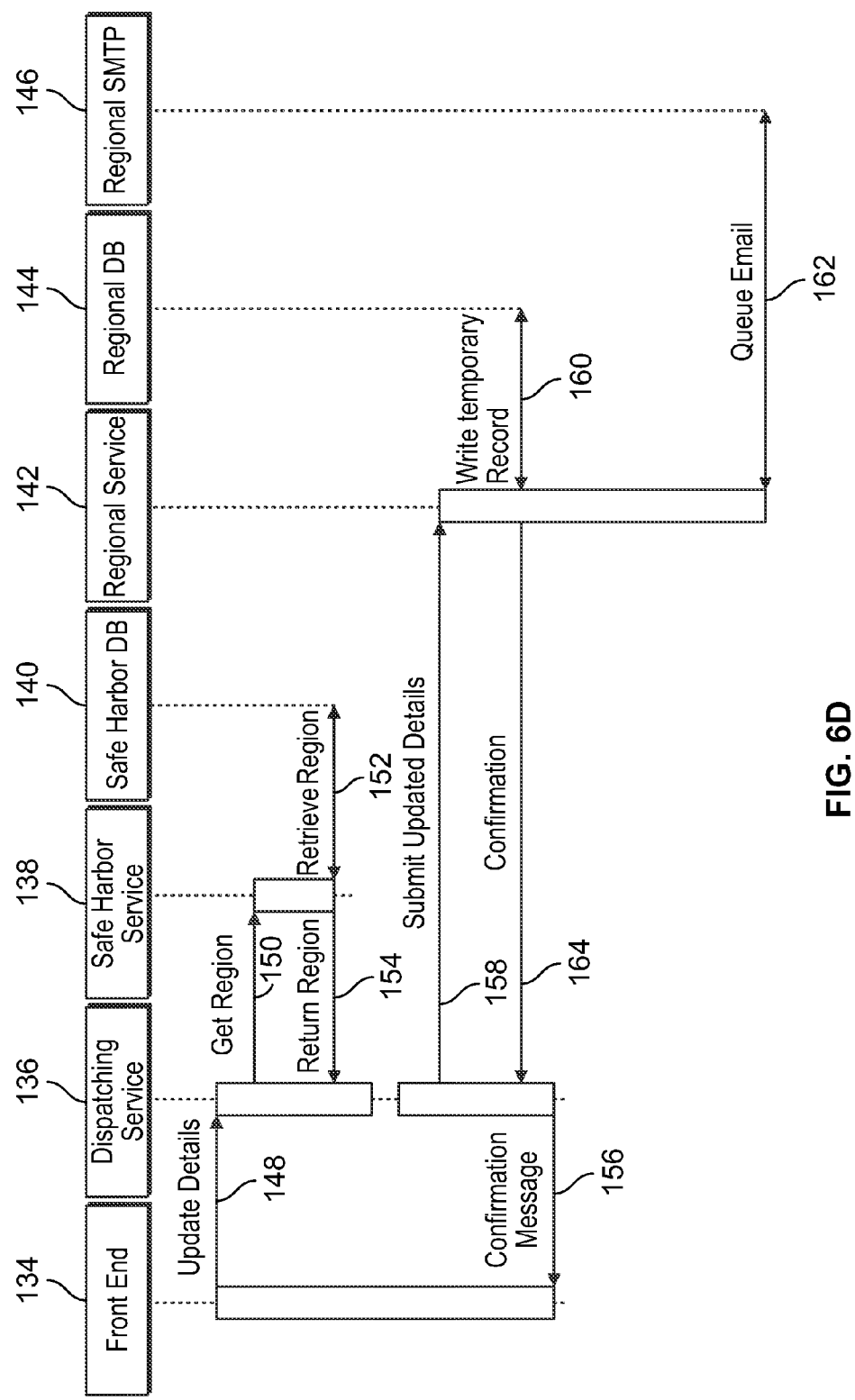
FIG. 6D shows the protocol for a user updating data for a Safe Harbor database and for other regional databases.

FIG. 6D shows the protocol for a user updating data for a Safe Harbor database 140 and for a regional database 144. Through the front end 134, a user sends a request to update details 148 of PII to the dispatching service 136. In a Safe Harbor, the dispatching service 136 sends a get region request 150 to the Safe Harbor service 138. The Safe Harbor service 138 retrieves a region from the Safe Harbor database 140 with a retrieve region request 152, and the Safe Harbor service 138 sends a return region response 154 to the dispatching service 136. The dispatching service 136 may the send a confirmation message 156 to the user through the front end 134. Within a region, the dispatching service 136 submits the updated details 158 to the regional service 142, which writes a temporary record 160 to the regional database 144 pending approval and queues an email 162 on the regional SMTP 146. The regional service 142 also sends a confirmation 164 to the dispatching service 136, which sends a confirmation message 156 to the user through the front end 134.

Figure 7A:
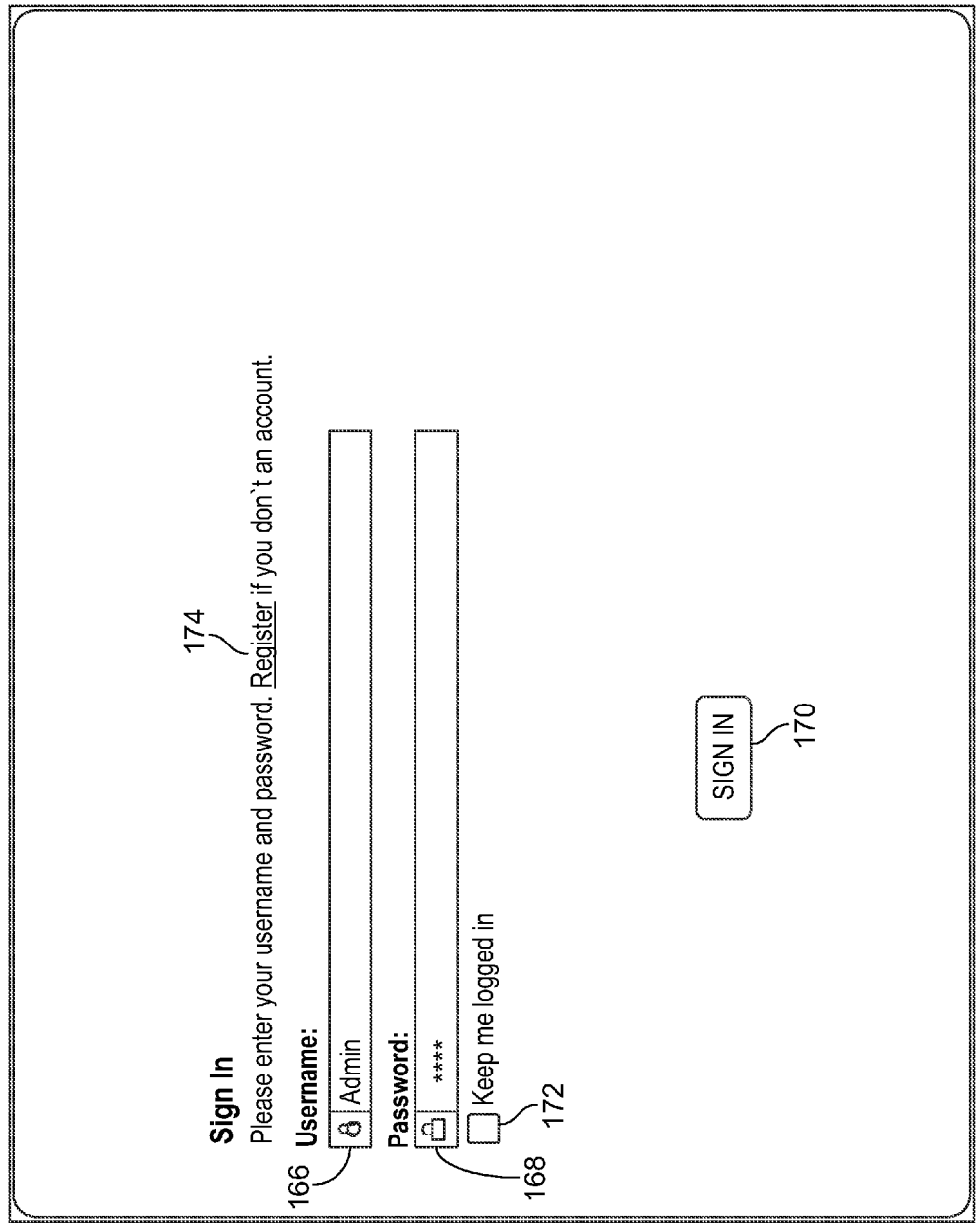
FIG. 7A shows a sample login screen.

The next several figures show computer screen shots of an implementation of a described embodiment. FIG. 7A shows a sample login screen. In this figure the system administrator is logging in by entering the username "Admin" in the username box 166 and a password in the password box 168. Once the user enters information into the username box 166 and the password box 168, the user may select the sign in button 170 to login. If the user wishes to remain continually logged in, the user may select the permanent login select button 172. A user is given the option to register for an account by choosing the register link 174.

FIG. 7B shows a sample customer data screen following an administrator's customer search. This screen displays a customer's account number 176, customer data with PII 178, the PII location 180, the region/jurisdiction 182 in which the customer is located, the customer's nationality 184, and the language 186 that the customer reads. From this screen the administrator may use the customer data modification link 188 to change information on the screen shown in FIG. 7B. The administrator may also choose the logout link 190 to logout.

Figure 7C:
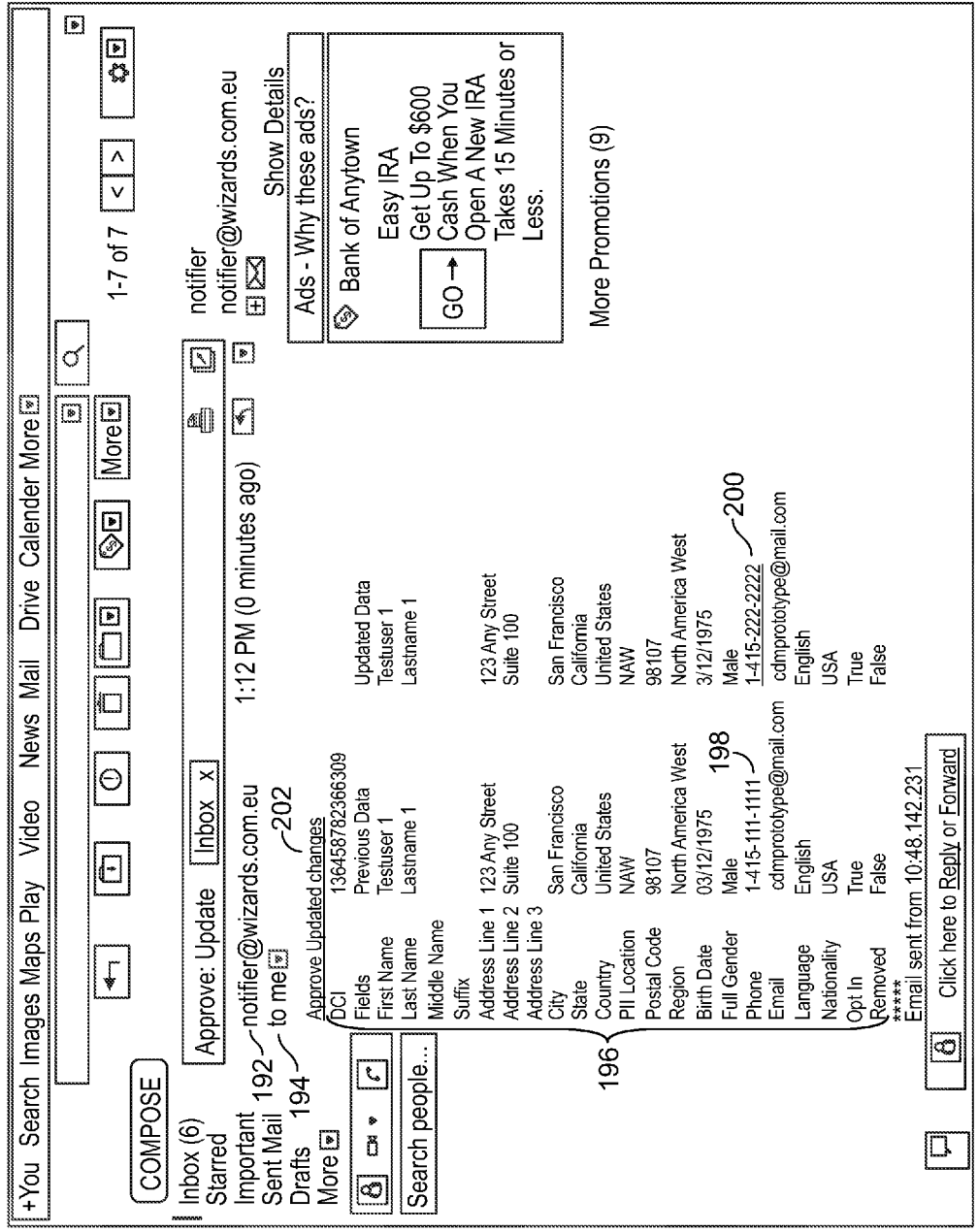
FIG. 7C shows a sample email allowing an administrator to approve an update of customer information.

FIG. 7C shows a sample email allowing an administrator to approve an update of customer information. The email shows in the "email from" notification 192 and the "email to" notification 194 that the email is from the company's notification system and to the administrator ("me"). The email displays the customer content 196, which contains the customer's PII. The email shows a comparison between the old PII data and the updated PII data. The customer content 196 also shows the changed data by showing the old telephone number 198 and the new telephone number 200. If the administrator wishes to approve the changes, the administrator may select the approve update link 202.

FIG. 7D shows a sample screen used outside of email for system administrator approval of data changes. The screen displays the customer content 196, which contains the customer's PII that has been unmasked in the administrator's jurisdiction at the administrator's location. The customer content 196 also shows the changed data by showing the old telephone number 198 and the new telephone number 200 highlighted. If the administrator wishes to approve the changes, the administrator may select the approve update button 204. This will cause a confirmation email to be sent to the customer. FIG. 7E shows a sample screen showing that the system administrator has approved changes. The screen displays the customer content 196, which contains the customer's PII that has been unmasked in the administrator's jurisdiction at the administrator's location. The customer content 196 also shows the changed data by showing the old telephone number 198 and the new telephone number 200 highlighted. The changes approved box 206 shows that the changes have been approved.

FIG. 7F shows a sample screen for creating a new customer account. This screen is selected by choosing the add form tab 208b. The form indicator 210 indicates that the user has chosen the Create New Customer Form. A user may choose other forms or screens by selecting the customer lookup tab 208a, the search/bulk email tab 208c, the configuration option tab 208d, and the about tab 208e. This screen indicates from the suffix entry 212 and the password entry 214 that an administrator may create a new customer account by completing the form and entering data, including customer PII.

FIG. 7G shows a sample screen for editing customer information. The form indicator 210 indicates that the user is editing customer information for the customer Testuser1 Lastname1. The changes may be entered by entering text into the text boxes or selecting items from boxes, buttons, menus, etc. and selecting the submit change button 216. The user may delete the customer by selecting the delete customer button 218. Editing customer information may be canceled by selecting the cancel button 220. A customer's PII location, or jurisdiction, may be changed by changing the value shown in the new PII location selector 222, which will show the current PII location before it is changed. After the new value for the new PII location selector 222 is chosen, the user may move the customer to a new jurisdiction by selecting the move customer button 224.

FIG. 7H shows a query used in a sample search screen for sending a bulk email to several regions. This screen becomes available when the user selects the search/bulk email tab 208c. The form that appears on the screen allows a user to enter data into the shown available fields. In this example, the user has used the account number field 226 to search for account numbers that are like "6789". FIG. 7H indicates that the user has already selected the search button 228 because the search summary 230 reveals that six customers were found, one in "North America West", one in "Germany" and four in "Europe". The search results 232 show the account number, first name and PII location 234 of the customers who match the search criteria. Note that all the customers shown have "6789" in their account numbers. Also note that the customers shown in the search results 232 have varied PII locations 234. If the user wishes to send a bulk email to all customers listed in the search results 232, then the user may select the edit bulk email message and send button 236.

FIG. 7I shows a sample screen used for system administrator approval of customer updates that generates an email to the customer. If the system administrator wishes to approve the customer updates demonstrated earlier, the administrator mat select the customer lookup tab 208a and press the approve customer button 238. An email will be generated and sent to the customer. FIG. 7J shows a system administrator's email inbox showing that the bulk email and the update confirmation email have been sent to customers. The sent bulk email list 240 shows that emails were sent to the six customers found from the search executed with reference to FIG. 7H.

Figure 7K:
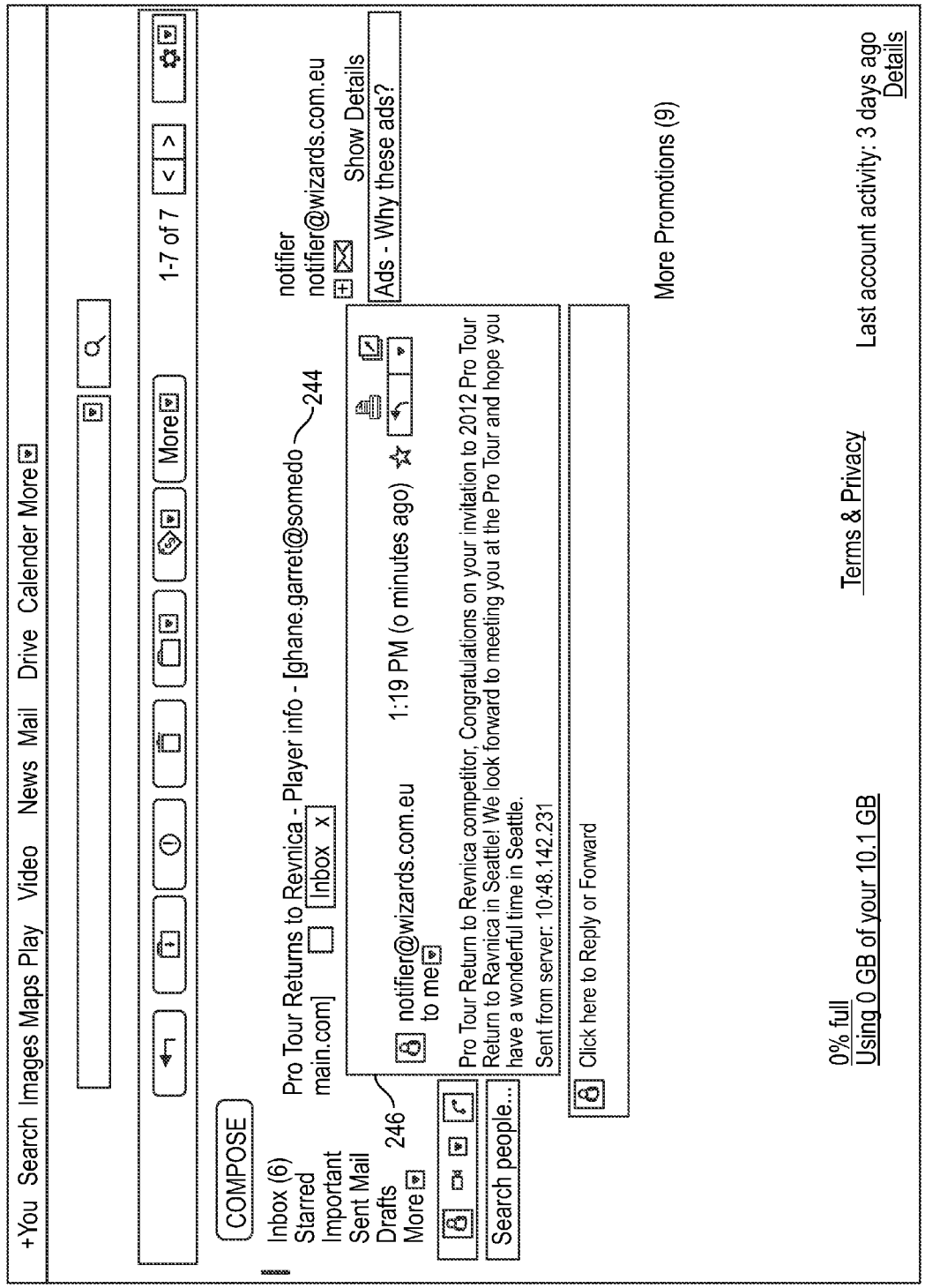
FIG. 7K shows a sample of the bulk email.

The approval email summary 242 shows that the customer was sent an email indicating update approval. FIG. 7K shows a sample of the bulk email. This email shows that the bulk email recipient 244 was ghane.garret@somedomain.com. The bulk email content 246 indicates that this was sent by the company notifier and copied to the system administrator.

The discussed screens for the discussed embodiments are meant as examples and not meant to limit the scope of the discussed embodiments. Similarly, the various embodiments and configurations discussed should not be considered limiting either.

While the present inventions have been illustrated by a description of various embodiments and while these embodiments have been set forth in considerable detail, it is intended that the scope of the inventions be defined by the appended claims. It will be appreciated by those skilled in the art that modifications to the foregoing preferred embodiments may be made in various aspects. It is deemed that the spirit and scope of the inventions encompass such variations to be preferred embodiments as would be apparent to one of ordinary skill in the art and familiar with the teachings of the present application.

What is claimed is:

1. A system for distributing personally identifiable information comprising:
   a regional server located in a first jurisdiction comprising:
      a first set of jurisdictional rules that define personally identifiable information for the first jurisdiction;
      a first computer application that inputs data, that applies the first set of jurisdictional rules to the data and that outputs a first data set that is personally identifiable information and a second data set that is not personally identifiable information;
      a first data repository in communication with the first computer application that stores data that have been input but that have not had the first set of jurisdictional rules applied;
      a second data repository in communication with the first computer application that stores the first data set;
      a first set of masking rules for masking the first data set; and
      a second computer application in communication with the first computer application that interprets and applies the first set of masking rules to obfuscate the first data set;
   a recipient computer located in a second jurisdiction that inputs data conforming to a second set of jurisdictional rules that define personally identifiable information for the second jurisdiction; and
   a central computer in communication with the regional server and the recipient computer comprising:
      a plurality of operational tools that use a ticket pattern to allow actions in the system including authentication, authorization, acceptance of terms and conditions, requirements and opt-in acceptance;
      a rules interpreter that inputs the first data set, that applies the second set of jurisdictional rules to the first data set and that outputs a third data set of personally identifiable information conforming to the second set of jurisdictional rules;
      a second set of masking rules for masking the third data set;
      a third computer application in communication with the rules interpreter that applies the second set of masking rules to obfuscate the third data set; and
      a fourth computer application that receives the first data set from the regional server and routes it to the rules interpreter and that receives the third data set from the third computer application and routes the third data set to the recipient computer.

2. The system recited in claim 1 further comprising a user interface in the regional server in communication with the first computer application for user data input and data editing.

3. The system recited in claim 1 further comprising an email facility in the regional server in communication with the first computer application wherein all email communication is within the first jurisdiction.

4. The system recited in claim 1 further comprising a firewall in the regional server to control all incoming and outgoing data.

5. The system recited in claim 1 further comprising a web service engine and web application hosting in the regional server.

6. The system recited in claim 1 further comprising a plurality of regional servers with each regional server located in one of a plurality of different jurisdictions and with each regional server in communication with the central computer and having a set of jurisdictional rules associated with the regional server located in said one of the plurality of different jurisdictions and a set of masking rules associated with the regional server located in said one of the plurality of different jurisdictions.

7. The system recited in claim 1 further comprising:
   a third-party cloud based customer relationship management software customer experience suite located in the second jurisdiction; and
   a fifth computer application in the central computer in communication with the rules interpreter and the third-party cloud based customer relationship management software customer experience suite that applies the second set of masking rules to obfuscate the third data set.

8. The system recited in claim 1 wherein the recipient computer further comprises:
   a customer management system user interface;
   a set of computer applications related to one or more the services provided to the regional server by the recipient computer; and
   a logical abstraction point between the set of computer applications and the central computer.

9. The system recited in claim 1 wherein each of the first jurisdiction and the second jurisdiction are one of a governmental jurisdiction and a synthetic jurisdiction.

10. The system recited in claim 1 further comprising treatment rules for the treatment of personally identifiable information attribute values that control an allowable use of data defined by the treatment rules and how data should be masked during one or more time periods defined by the treatment rules when approvals and other actions must occur.

11. The system recited in claim 1 further comprising administrative rules for supporting creation, specification and management of personally identifiable information attributes with attribute values supporting creation, retrieval, updating, deletion and movement of jurisdictions.

12. A network for managing personally identifiable information exchanged between computer systems in jurisdictions having different rules regarding handling personally identifiable information comprising:
   a plurality of regional servers residing in a plurality of respective jurisdictions with each regional server comprising:
      a first set of jurisdictional rules that define personally identifiable information for the respective jurisdiction;

a first computer application that inputs data, that applies the first set of jurisdictional rules to the data and that outputs a first data set that is personally identifiable information and a second data set that is not personally identifiable information;

a first data repository in communication with the first computer application that stores data that have been input but that have not had the first set of jurisdictional rules applied;

a second data repository in communication with the first computer application that stores the first data set;

a first set of masking rules for masking the first data set; and a second computer application in communication with the first computer application that interprets and applies the first set of masking rules to obfuscate the first data set;

a recipient computer located in one of the plurality of jurisdictions that inputs data conforming to the respective set of jurisdictional rules that define personally identifiable information for the respective jurisdiction; and a central computer in communication with the plurality of regional servers and the recipient computer comprising:

a rules interpreter that inputs the first data set, that applies the set of jurisdictional rules for the recipient computer to the first data set and that outputs a third data set of personally identifiable information conforming to the set of jurisdictional rules for the recipient computer;

a second set of masking rules for masking the third data set;

a third computer application in communication with the rules interpreter that applies the second set of masking rules to obfuscate the third data set;

a fourth computer application that receives the first data set from the regional server and routes it to the rules interpreter and that receives the third data set from the third computer application and routes the third data set to the recipient computer; and one or more administrative rules for supporting creation, specification and management of personally identifiable information attributes with attribute values.

13. The network recited in claim 12 further comprising:
a user interface in each regional server in communication with the first computer application for user data input and data editing;
an email facility in each regional server in communication with the first computer application wherein all email communication is within a jurisdiction;
a firewall in each regional server to control all incoming and outgoing data; and
a web service engine and web application hosting in each regional server.

14. The network recited in claim 12 further comprising:
a third-party cloud based customer relationship management software customer experience suite located in the jurisdiction with the recipient computer; and
a fifth computer application in the central computer in communication with the rules interpreter and the third-party cloud based customer relationship management software customer experience suite that applies the set of masking rules used in the jurisdiction with the recipient computer to obfuscate the third data set.

15. The network recited in claim 12 wherein the recipient computer further comprises:
a customer management system user interface;
a set of computer applications related to one or more services provided to the regional servers by the recipient computer; and
a logical abstraction point between the set of computer applications and the central computer.

16. The network recited in claim 12 wherein each of the jurisdictions is one of a governmental jurisdiction and a synthetic jurisdiction.

17. The system recited in claim 12 further comprising operational tools that use a ticket pattern to allow actions in the system including authentication, authorization, acceptance of terms and conditions, requirements and opt-in acceptance.

18. A method for distributing personally identifiable information comprising:
providing a regional server located in a first jurisdiction comprising:
defining personally identifiable information for the first jurisdiction with a first set of jurisdictional rules;
executing a first computer application to input data, to apply the first set of jurisdictional rules to the data and to output a first data set that is personally identifiable information and a second data set that is not personally identifiable information;
providing a first data repository in communication with the first computer application that stores data that have been input but that have not had the first set of jurisdictional rules applied;
providing a second data repository in communication with the first computer application that stores the first data set;
defining a first set of masking rules for masking the first data set; and
executing a second computer application in communication with the first computer application that interprets and applies the first set of masking rules to obfuscate the first data set;
providing a recipient computer located in a second jurisdiction that inputs data conforming to a second set of jurisdictional rules that define personally identifiable information for the second jurisdiction; and
providing a central computer in communication with the regional server and the recipient computer comprising:
executing a rules interpreter to input the first data set, to apply the second set of jurisdictional rules to the first data set and to outputs a third data set of personally identifiable information conforming to the second set of jurisdictional rules;
defining a second set of masking rules for masking the third data set;
executing a third computer application in communication with the rules interpreter that applies the second set of masking rules to obfuscate the third data set;
executing a fourth computer application that receives the first data set from the regional server and routes it to the rules interpreter and that receives the third data set from the third computer application and routes the third data set to the recipient computer; and
one or more treatment rules for the treatment of personally identifiable information attribute values that control an allowable use of data defined by the treatment rules and how data should be masked.

19. The method recited in claim 18 further comprising:
providing a third-party cloud based customer relationship management software customer experience suite located in the jurisdiction with the recipient computer; and executing a fifth computer application in the central computer in communication with the rules interpreter and the third-party cloud based customer relationship management software customer experience suite.

20. The system recited in claim 18 further comprising operational tools that use a ticket pattern to allow actions in the system including authentication, authorization, acceptance of terms and conditions, requirements and opt-in acceptance.

* * * * *